(12) United States Patent
Aramaki et al.

(10) Patent No.: US 7,801,146 B2
(45) Date of Patent: Sep. 21, 2010

(54) TRANSMISSION-RECEPTION APPARATUS

(75) Inventors: Takashi Aramaki, Kanagawa (JP);
Yoshimasa Shirasaki, Kanagawa (JP);
Hiroaki Sudo, Kanagawa (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 12/102,786

(22) Filed: Apr. 14, 2008

(65) Prior Publication Data
US 2008/0198855 A1    Aug. 21, 2008

Related U.S. Application Data

(60) Division of application No. 11/128,317, filed on May 13, 2005, now abandoned, which is a continuation of application No. 09/674,729, filed as application No. PCT/JP00/01419 on Mar. 9, 2000, now Pat. No. 6,909,718.

(30) Foreign Application Priority Data

Mar. 10, 1999   (JP)   ................... 11-107032
Mar. 18, 1999   (JP)   ................... 11-074632

(51) Int. Cl.
   *G06F 11/10*   (2006.01)
(52) U.S. Cl. .................. 370/394; 714/50; 714/748
(58) Field of Classification Search ................. 370/252, 370/389, 392, 394, 400, 401, 465, 474; 714/48–50, 714/748–750, 758
See application file for complete search history.

(56) References Cited

U.S. PATENT DOCUMENTS

| 4,422,171 A | 12/1983 | Wortley |
|---|---|---|
| 4,726,027 A | 2/1988 | Nakamura |
| 4,905,234 A | 2/1990 | Childress |
| 5,031,179 A | 7/1991 | Yoshida |
| 5,444,718 A | 8/1995 | Ejzak |
| 5,717,689 A | 2/1998 | Ayanoglu |
| 5,889,790 A | 3/1999 | Fukuda |
| 5,907,563 A | 5/1999 | Takeuchi et al. |
| 5,974,028 A | 10/1999 | Ramakrishnan |
| 6,021,124 A | 2/2000 | Haartsen |
| 6,163,861 A | 12/2000 | Yoshioka |
| 6,212,240 B1 | 4/2001 | Scheibel |
| 6,292,470 B1 | 9/2001 | Uota |

(Continued)

FOREIGN PATENT DOCUMENTS

| JP | 63062435 | 3/1988 |
|---|---|---|
| JP | 3237829 | 10/1991 |
| JP | 9284261 | 10/1997 |
| JP | 9307535 | 11/1997 |

OTHER PUBLICATIONS

PCT International Search Report dated Jun. 13, 2000.
Atsushi Ohta et al., "PRIME ARQ: A Novel ARQ Scheme for Highspeed Wireless ATM -Design, implementation and performance evaluation-", Vehicular Technology Conference, 1998. VTC 98.48th, IEEE vol. 2, pp. 1128-1134.

*Primary Examiner*—Pankaj Kumar
*Assistant Examiner*—Duc T Duong
(74) *Attorney, Agent, or Firm*—Dickinson Wright PLLC

(57) ABSTRACT

A transmission-reception apparatus does not configure ARQ control information from only sequence number, but the transmission-reception apparatus configures the ARQ control information such that the ARQ control information is comprised of one sequence number containing first occurrence of a corresponding packet's error, and bit information representing existence of retransmission requirements about sequence numbers followed on the heels of such the one sequence number.

14 Claims, 34 Drawing Sheets

U.S. PATENT DOCUMENTS

| | | |
|---|---|---|
| 6,301,249 B1 | 10/2001 | Mansfield |
| 6,317,430 B1 * | 11/2001 | Knisely et al. .............. 370/394 |
| 6,367,045 B1 | 4/2002 | Khan |
| 6,424,625 B1 | 7/2002 | Larsson |
| 6,507,582 B1 * | 1/2003 | Abrol ........................ 370/394 |
| 6,581,176 B1 | 6/2003 | Seo |

* cited by examiner

TRANSMISSION-RECEPTION APPARATUS

This is a divisional of application Ser. No. 11/128,317 filed May 13, 2005, which is a continuation of application Ser. No. 09/674,729 (U.S. Pat. No. 6,909,718), which is a 371 of PCT/JP2000/001419 filed Mar. 9, 2000, which is based on JP 11-107032 filed Mar. 10, 1999 and JP 11-074632 filed Mar. 18, 1999, the entire contents of which are incorporated by reference herein.

TECHNICAL FIELD

The present invention relates to a transmission-reception apparatus. More to particularly, the present invention relates to a transmission-reception apparatus and an error control method which perform error control in data transmission due to execution of automatic request for repetition (ARQ) in mobile communication.

BACKGROUND ART

The ARQ (Automatic Request for Repetition) means that a reception side requires a repeat of data with voluntary unit of data quantity (for instance, unit per packet, unit per cell) to transmission side. Three systems of Stop And Wait ARQ (SW-ARQ) system, Go Back N ARQ (GBN-ARQ) system, and Selective Repeat ARQ (SR-ARQ) system are well known as system of the ARQ.

Further, recently, a system of PRIME-ARQ is proposed. The PRIME-ARQ system combines the GBN-ARQ system and the SR-ARQ system. The GBN-ARQ system retransmits all of packets or cells finished transmission, whose temporal order is later than an instructed sequence number (hereinafter referred to as SN). The SR-ARQ system retransmits only the packets or the cells corresponding to the instructed SN.

In the PRIME-ARQ system, retransmission is performed in accordance with following procedure. A reception side finds SN corresponding to packets or cells that are not received. The reception side returns prescribed numbers of the SN corresponding to packets or cells that are not received by way of ARQ control information to a transmission side. The transmission side retransmits the packets or the cells corresponding to the SN instructed on the basis of the ARQ control information received. The transmission side retransmits about all of the packets or the cells finished transmission that are followed on the heels of the latest SN about temporal order from among the SN undergoing repeat instruction.

Hereinafter, there will be described about the PRIME-ARQ system while employing FIG. 1 as well as FIG. 2. FIG. 1 is a block diagram indicating rough configuration of a transmission-reception apparatus for performing error control of the PRIME-ARQ system. FIG. 2 is an operational diagram indicating one example of sequence of the PRIME-ARQ system. Moreover, in this stage, the ARQ is performed with unit of the packet.

Moreover, in this stage, unidirectional data transmission is supposed, consequently, configuration of the transmission-reception apparatus is indicated while being separated into a transmission side and a reception side. Furthermore, in view of characteristic of the present invention, the present description indicates only configuration concerning retransmission control.

In FIG. 1, the transmission side includes a transmission buffer 1 for giving the SN to transmission data packet to store therein, a modulator 2 for performing modulation processing while adding CRC (cyclic redundancy check) to the transmission data packet, a D/A converter 3 for performing D/A conversion processing to a transmission signal after modulation processing, a transmission RF section 4 for transmitting a transmission signal after D/A conversion from an antenna (not illustrated), a reception RF section 5 for receiving radio signals from an antenna (not illustrated), an A/D converter 6 for performing A/D conversion of reception signal, a demodulation processor 7 for performing demodulation processing as well as CRC check to reception signal after A/D conversion to extract ARQ control information, and a retransmission controller 8 for instructing to retransmit the SN undergoing retransmission requirement to transmission buffer 1 on the basis of the ARQ control information from among the reception signals.

On the other hand, a reception station includes a reception RF section 9 for receiving radio signals from an antenna (not illustrated), an A/D converter 10 for performing A/D conversion of the reception signal, a demodulation processor 11 for performing demodulation processing as well as CRC check to the reception signal after A/D conversion, a SN judgement section 12 for performing check of the SN given to the data packet to the reception signal after demodulation processing to perform judgement of SN omission as well as removal of SN information, a reception buffer 13 for storing therein the data packet of the reception signal after removal of the SN information, a retransmission control information generator 14 for generating ARQ control information from judgement result in the SN judgement section 12, a modulator 15 for performing modulation processing while adding the CRC to the ARQ control information generated, a D/A converter 16 for performing D/A conversion of the transmission signal after modulation processing, and a transmission RF section 17 for transmitting the transmission signal after D/A conversion from an antenna (not illustrated).

In the first place, there is described operation of the transmission side. Inputted transmission packet to which the SN is added is stored in the transmission buffer 1. The stored transmission packet is outputted on the basis of repeat SN instructed from the retransmission controller 8 by the transmission buffer 1. The data packet outputted from the transmission buffer 1 is transmitted from an antenna (not illustrated) through the modulator 2, the D/A converter 3, and the transmission RF section 4.

The signal received by the reception RF section 5 is inputted to the retransmission controller 8 through the A/D converter 6 and the demodulation processor 7, and the SN undergoing retransmission requirement is instructed to the transmission buffer 1.

Next, there is described operation of the reception side. The signal received by the reception RF section 9 is inputted to the SN judgement section through the A/D converter 10 and the demodulation processor 11. Then, the signal is judged about omission of the data packet on the basis of the SN which is added to respective data packets of the reception signals by the SN judgement section 12. The SN with omission is outputted to the retransmission control information generator 14 as judgement result.

The omission of the data packet among the reception signal is converted into the ARQ control information by the retransmission control information generator 14 to be outputted. The generated ARQ control information is transmitted from an antenna (not illustrated) by the transmission RF section 17 through the modulator 15, and the D/A converter 16. Furthermore, the data packet which is judged as receivable by the SN judgement section 12 is inputted to the reception buffer 13 to be stored therein while being removed the SN from the data packet.

Subsequently, there is described one example of sequence in the PRIME-ARQ system while employing FIG. 2.

In FIG. 2, it is indicated that in a first frame transmission from the transmission side, packets #1 to #9 (SN=1 to 9) are transmitted, while in the reception side, reception of the SN=2, 4, 5, 8 is failure.

Here, when the number of the ARQ control information determined before hand is taken to be three (3), the reception side performs the retransmission requirement about three packets of SN=2, 4, 5 while employing the ARQ control signal. The transmission side receives the ARQ control signal, then, performing retransmission about the packet finished transmission whose SN is equal to 2, 4, 5 as well as after SN corresponding to 6. The reception side neglects the packet finished reception.

Thus, in the PRIME-ARQ system, since it is capable of performing many retransmission requirements with small data quantity, transmission efficiency improves in comparison with the conventional three systems.

However, in the error control of the conventional PRIME-ARQ system, there is the problem that when there occurs burst error more than the number of SN which is capable of being represented by the retransmission control information, transmission efficiency deteriorates. Furthermore, when the system increases quantity of retransmission control information for improvement of error rate, there occurs the problem that the transmission efficiency deteriorates.

DISCLOSURE OF INVENTION

It is an object of the present invention to provide a transmission-reception apparatus enables error rate to be reduced without deterioration of transmission efficiency.

The subject matter of the present invention is that in the PRIME-ARQ system, ARQ control information is not configured by only the sequence number, but the ARQ control information is configured in such a way that the ARQ control information includes one sequence number corresponding to the first occurrence of packet's error, and bit information representing existence of retransmission requirements about sequence numbers followed on the heels of this sequence number corresponding to the first occurrence of the packet's error.

BEST MODE FOR CARRYING OUT THE INVENTION

Hereinafter, there will described about embodiments of the present invention in detail referring to the accompanying drawings. Moreover, for simplification, in the following whole embodiments, unidirectional data transmission is supposed, consequently, configuration of the transmission-reception apparatus should be indicated while being separated into a transmission side and a reception side. Furthermore, in view of characteristic of the present invention, the present description should indicate only configuration in connection with retransmission control.

EMBODIMENT 1

Figure 1:
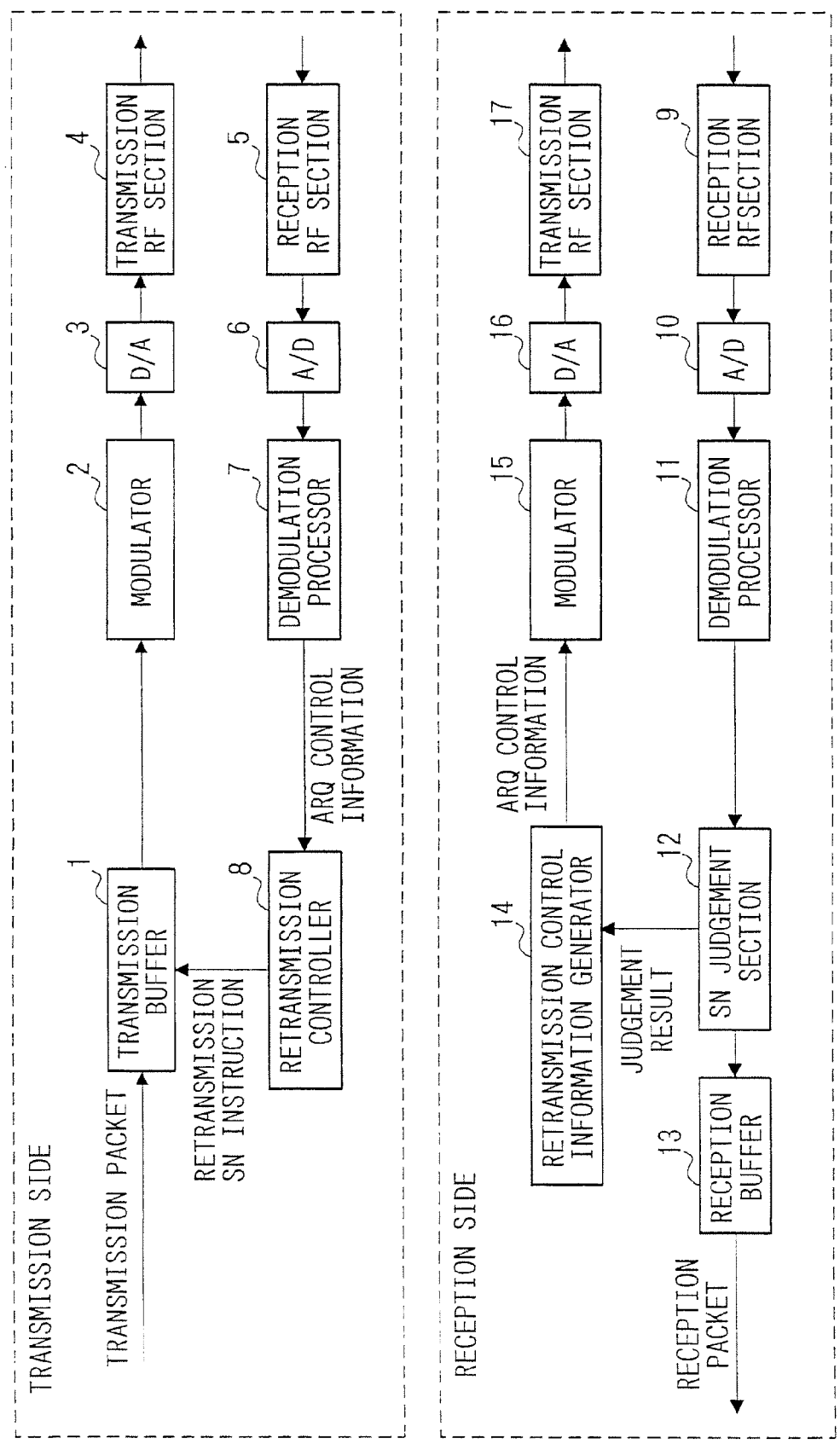
FIG. 1 is a block diagram indicating outline configuration of a transmission-reception apparatus for performing error control of the PRIME-ARQ system.
Figure 2:
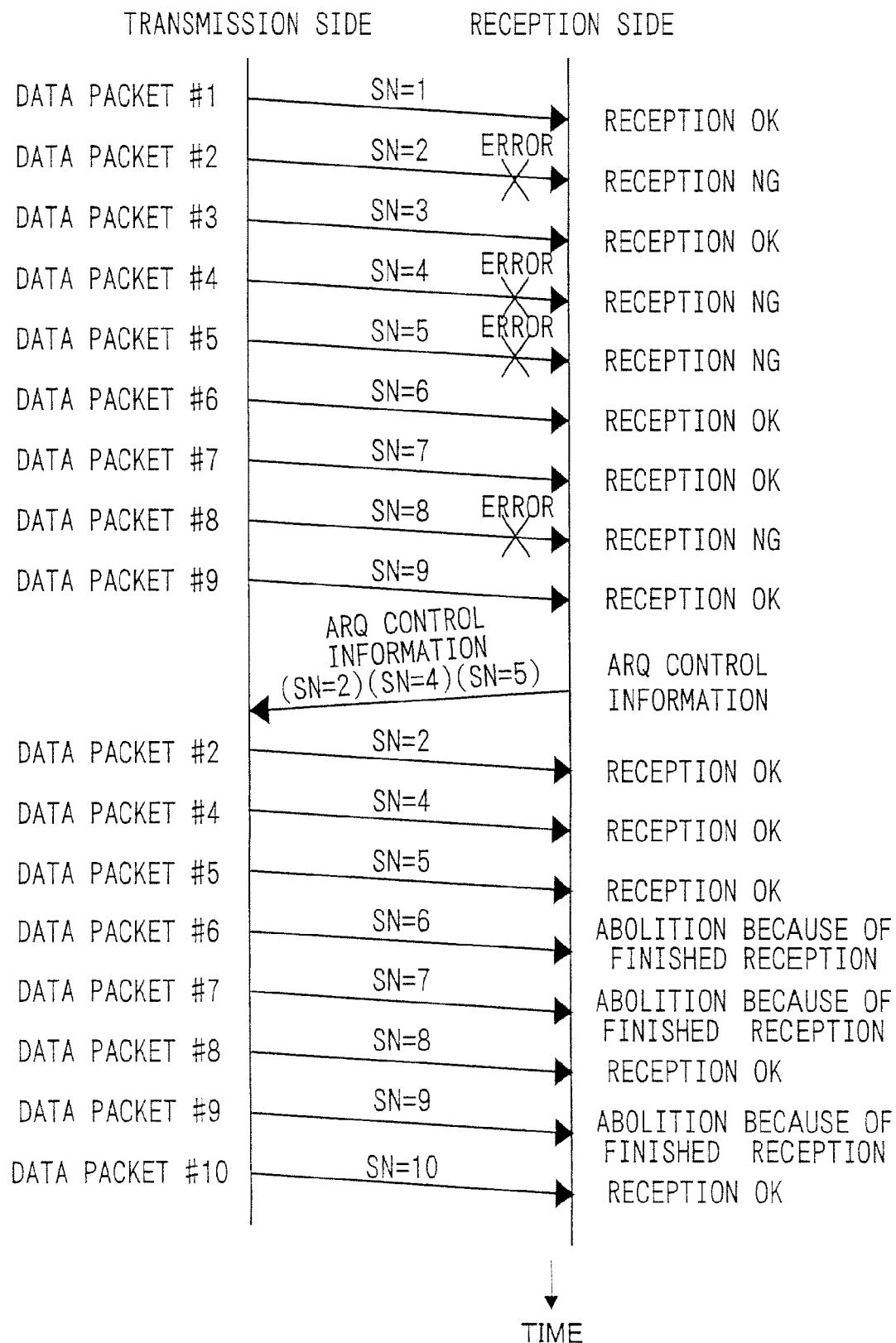
FIG. 2 is an operational diagram indicating one example of sequence of the PRIME-ARQ system.
Figure 3:
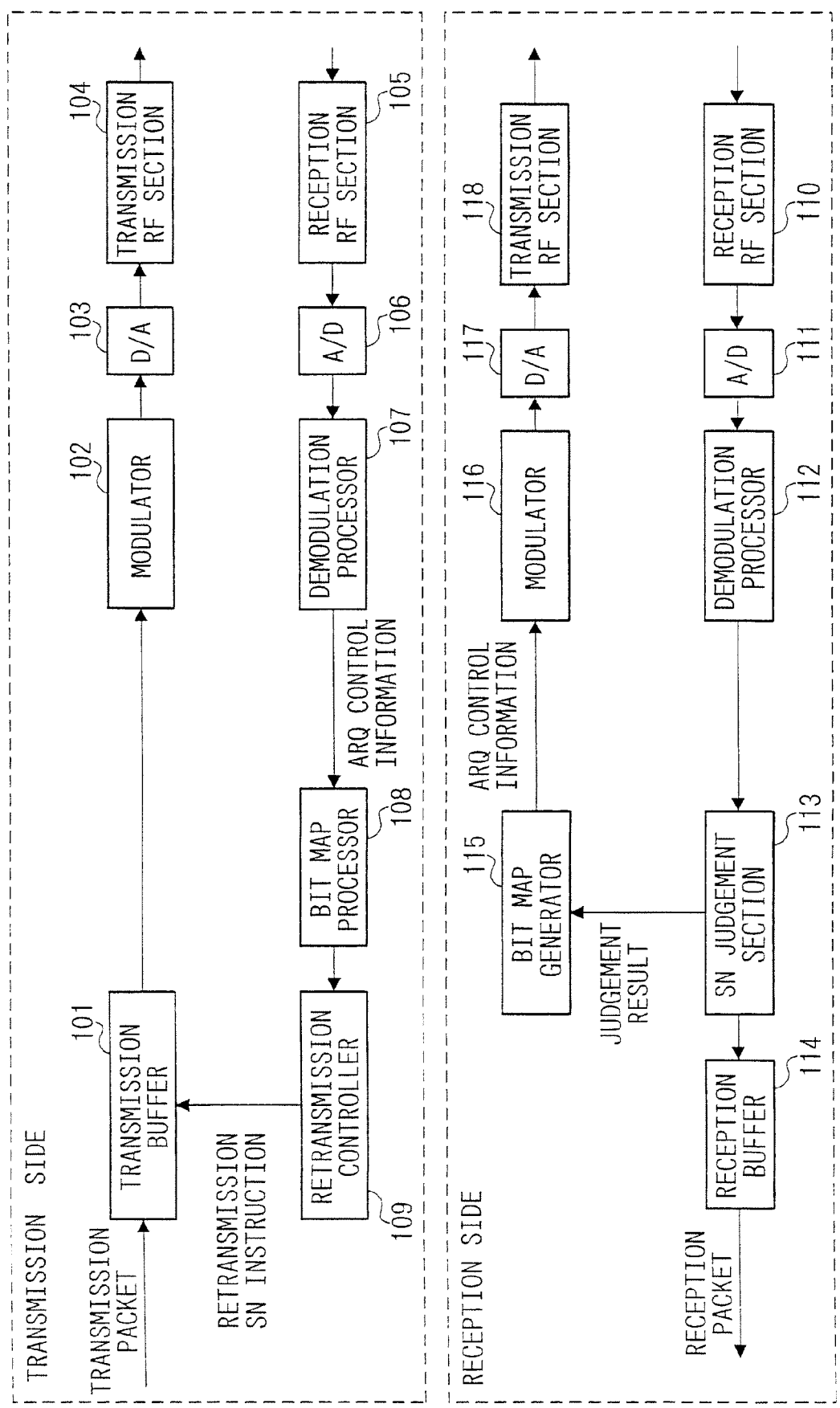
FIG. 3 is a block diagram indicating outline configuration of a transmission-reception apparatus concerning an embodiment 1 of the present invention.
Figure 4:
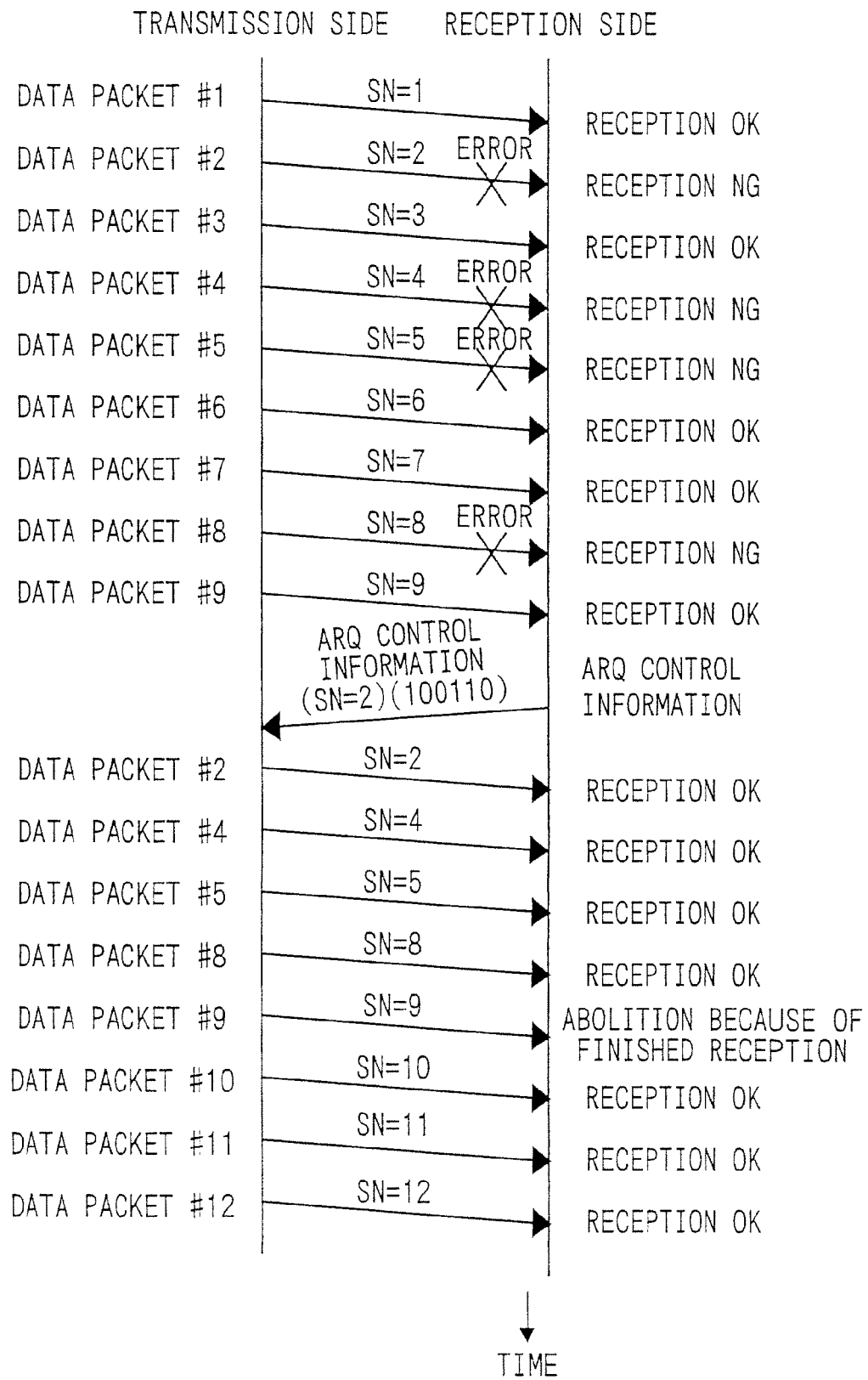
FIG. 4 is an operational diagram indicating one example of sequence concerning an embodiment 1.
Figure 5:
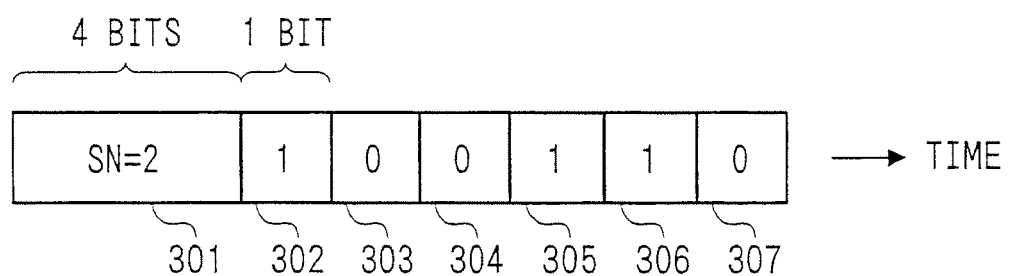
FIG. 5 is a view indicating one configuration example of ARQ control information concerning the embodiment 1 of the present invention.

Hereinafter, there will be described about a transmission-reception apparatus and an error control method concerning the present embodiment while employing FIG. 3 to FIG. 5. FIG. 3 is a block diagram indicating outline configuration of the transmission-reception apparatus concerning the embodiment 1 of the present invention. FIG. 4 is an operational diagram indicating one example of sequence concerning the embodiment 1. FIG. 5 is a view indicating one configuration example of ARQ control information concerning the embodiment 1 of the present invention.

In FIG. 3, the transmission side includes a transmission buffer 101 for giving SN to a transmission data packet to store therein, a modulator 102 for performing modulation processing while adding CRC (cyclic redundancy check) to the transmission data packet, a D/A converter 103 for performing D/A conversion processing to a transmission signal after modulation processing, a transmission RF section 104 for transmitting a transmission signal after D/A conversion from an antenna not illustrated, a reception RF section 105 for receiving radio signals from an antenna not illustrated, an A/D converter 106 for performing A/D conversion of the reception signal, a demodulation processor 107 for performing demodulation processing as well as CRC check to the reception signal after A/D conversion to extract ARQ control information, a bit map processor 108 for discriminating SN undergoing retransmission requirement from the extracted ARQ control information, and a retransmission controller 109 for instructing to retransmit the SN undergoing retransmission requirement to transmission buffer 101.

On the other hand, a reception station includes a reception RF section 110 for receiving radio signals from an antenna not illustrated, an A/D converter 111 for performing A/D conversion of the reception signal, a demodulation processor 112 for performing demodulation processing and CRC check to the reception signal after A/D conversion, a SN judgement section 113 for performing check of the SN given to the data packet with respect to the reception signal after demodulation processing to perform judgement of SN omission as well as removal of SN information, a reception buffer 114 for storing therein the data packet of the reception signal after removal of the SN information, a bit map generator 115 for generating the ARQ control information of bit map format from judgement result in the SN judgement section 113, a modulator 116 for performing modulation processing while adding the CRC to the ARQ control information generated, a D/A converter 117 for performing D/A conversion of the transmission signal after modulation processing, and a transmission RF section 118 for transmitting the transmission signal after D/A conversion from an antenna not illustrated.

In the first place, there will be described operation of the transmission side. Inputted transmission packet to which the SN is added is stored in the transmission buffer 101. The stored transmission packet is outputted on the basis of retransmission SN instructed from the retransmission controller 109 by the transmission buffer 101. The data packet outputted from the transmission buffer 101 is transmitted from an antenna not illustrated through the modulator 102, the D/A converter 103, and the transmission RF section 104.

The signal received by the reception RF section 105 is inputted to the bit map processor 108 through the A/D converter 106 and the demodulation processor 107, then, the SN undergoing retransmission requirement from among the ARQ control information is extracted. The extracted SN undergoing retransmission requirement is communicated to be instructed to the transmission buffer 101 by the retransmission controller 109.

Next, there will be described operation of the reception side. The signal received by the reception RF section 110 is inputted to the SN judgement section 113 through the A/D converter 111 and the demodulation processor 112. Then, the signal is judged about omission of the data packet on the basis of the SN which is added to respective data packets of the reception signals by the SN judgement section 113. The SN with omission is outputted to the bit map generator 115 as judgement result.

The omission of the data packet among the reception signals is converted into the ARQ control information by the bit map generator 115 to be outputted. The generated ARQ control information is transmitted from the transmission RF section 118 through the modulator 116, and the D/A converter 117. Furthermore, the data packet which is judged as receivable by the SN judgement section 113 is inputted to the reception buffer 114 to be stored therein while the SN being removed from the data packet.

Next, there will be described about transmission sequence view of FIG. 4.

The transmission side adds "SN=1 to 12" to the data packet of "data packets #1 to #12" to transmit. In the reception side, the error occurs in four packets corresponding SN of "SN=2, 4, 5, 8". The reception side detects the error of the data packets corresponding to the SN of "SN=2, 4, 5, 8". The reception side requires retransmission of the data packets corresponding to the SN of "SN=2, 4, 5, 8" to the transmission side while employing the ARQ control information.

There will be indicated about bit configuration of the ARQ control information in FIG. 5. The ARQ control information is configured by the SN corresponding to data packet which is detected firstly as an error, and information with bit map format indicating existence of retransmission requirement of the data packets with prescribed numbers followed on the heels of such the first SN corresponding to first error of the data packet.

In the one enforcement example of the ARQ control information indicated in FIG. 5, a bit group 301 including four bits which is positioned in the beginning thereof should be employed for representing SN corresponding to the packet data with the first error. This SN is 2, namely "SN=2" corresponds to the packet data with the first error. Further, the number of the bit configuring the bit group 301 is not limited to "four bits", but it is capable of being set to voluntary value.

Moreover, a bit group (here, six bits) followed on the heel of the bit group representing the SN corresponding to the packet data with the first error, indicates existence of the retransmission requirement in the SN which is followed on the heels of the SN added firstly. Namely, here, since the bit group 301 indicates "SN=2", bit 302 to bit 307 indicate existence of the retransmission requirements of the data packet corresponding to SN of "SN=3 to 8" respectively. For instance, as illustrated in FIG. 5, it is indicated that no retransmission requirement is 1, and retransmission requirement is 0.

Consequently, in the one enforcement example indicated in FIG. 5, firstly, the bit group 301 is "SN=2". This indicates that error occurs about "SN=2". Moreover, bit 302, bit 305, as well as bit 306 are represented by 1, therefore, it indicates that reception is performed normally about the SN of "SN=3, 6, 7". Further, bit 303, bit 304, as well as bit 307 are represented by 0, therefore, it indicates that error occurs about the SN of "SN=4, 5, 8".

The transmission side which receives such the ARQ control information from the reception side, retransmits the data packets corresponding to the SN of "SN=2, 4, 5, 8". Moreover, in the same way as the conventional PRIME-ARQ system, the transmission side retransmits all of the data packet about SN which is finished transmission (here, corresponding SN is only SN=9). Namely, here, the SN (SN=9) is followed on the heels of the SN (here, corresponding SN is SN=8) which is the latest SN abut the temporal order among the SN instructed by the ARQ control information. Accordingly, the transmission side retransmits about the data packet corresponding to the SN of "SN=9".

Consequently, about one example of occurrence of the error indicated in FIG. 4 as well as FIG. 5, supposing that error is represented with the ARQ control signal in the conventional PRIME-ARQ system, if 4 bits are employed for indicating one SN, "16 bits=4 bits×4 error SN" becomes necessary. However, according to the present embodiment, the ARQ control information concerning the present embodiment is capable of being transmitted by employing only "10 bits=4 bits (SN=2)+6 bits (SN=3 to 8)" for transmitting the same information by virtue of employment of the bit map format.

Moreover, in the conventional ARQ control information, when the transmission-reception apparatus increases information quantity transmitted by the ARQ control information in order to make provision for more error occurrence, four bits are required in order to increase one SN. However, in the ARQ control information employing the bit map format concerning the present embodiment, only one bit is required in order to increase one SN. Consequently, in the present invention, the larger the number of SN indicated by the ARQ control information, the more the present invention has the effects.

Thus, according to the present embodiment, the ARQ retransmission control information is not configured from the SN group for requiring retransmission, but the ARQ retransmission control information is configured from both one SN for requiring retransmission and a bit map for representing existence of retransmission about the SN followed on the heels of such one SN. Accordingly, it is capable of increasing retransmission control information quantity without deteriorating transmission efficiency, thus the error rate can be improved.

Further, the bit group representing the SN is not limited in four bits. Any bit number can be employed.

EMBODIMENT 2

A transmission-reception apparatus and error control method concerning the present embodiment 2 has the same configuration as that of the embodiment 1. However, slot number (position information) indicating position in the frame instead of SN is employed.

A numerical value employed for the SN is repeated with fixed cycle. However, since there is retransmission of the SN, it should take account of the retransmission of the SN. The numeral value to the extent of relatively large numeral value is employed. Usually, appropriate numeral value in accordance with the transmission system is employed.

For instance, in the transmission protocol of HDLC (High Level Data Link Control) or X.25 packet switching, three bits (modulo-8, sequence number 0 to 7) or seven bits (module-128, sequence number 0 to 127) is employed. In the transmission protocol of PPP (Point-Point Protocol), the value of 24 bits (modulo 24: sequence number 0 to 232-1) is employed. In the transmission protocol of TCP (Transmission Control Protocol), the value of 32 bits (modulo 32: sequence number 0 to 232-1) is employed.

If the value of the SN is large, a lot of numbers of bit are required for representing the SN. Accordingly, in the present embodiment, position information within the frame, namely, the slot number should be employed within the ARQ control information instead of the SN.

The numbers of slot within one frame is far smaller than the value to be taken by the SN, consequently, the bit number does not become large. For instance, if one frame is constituted from 16 slots, the position information within the frame is always capable of being represented with 4 bits concerning the whole information.

Figure 6:
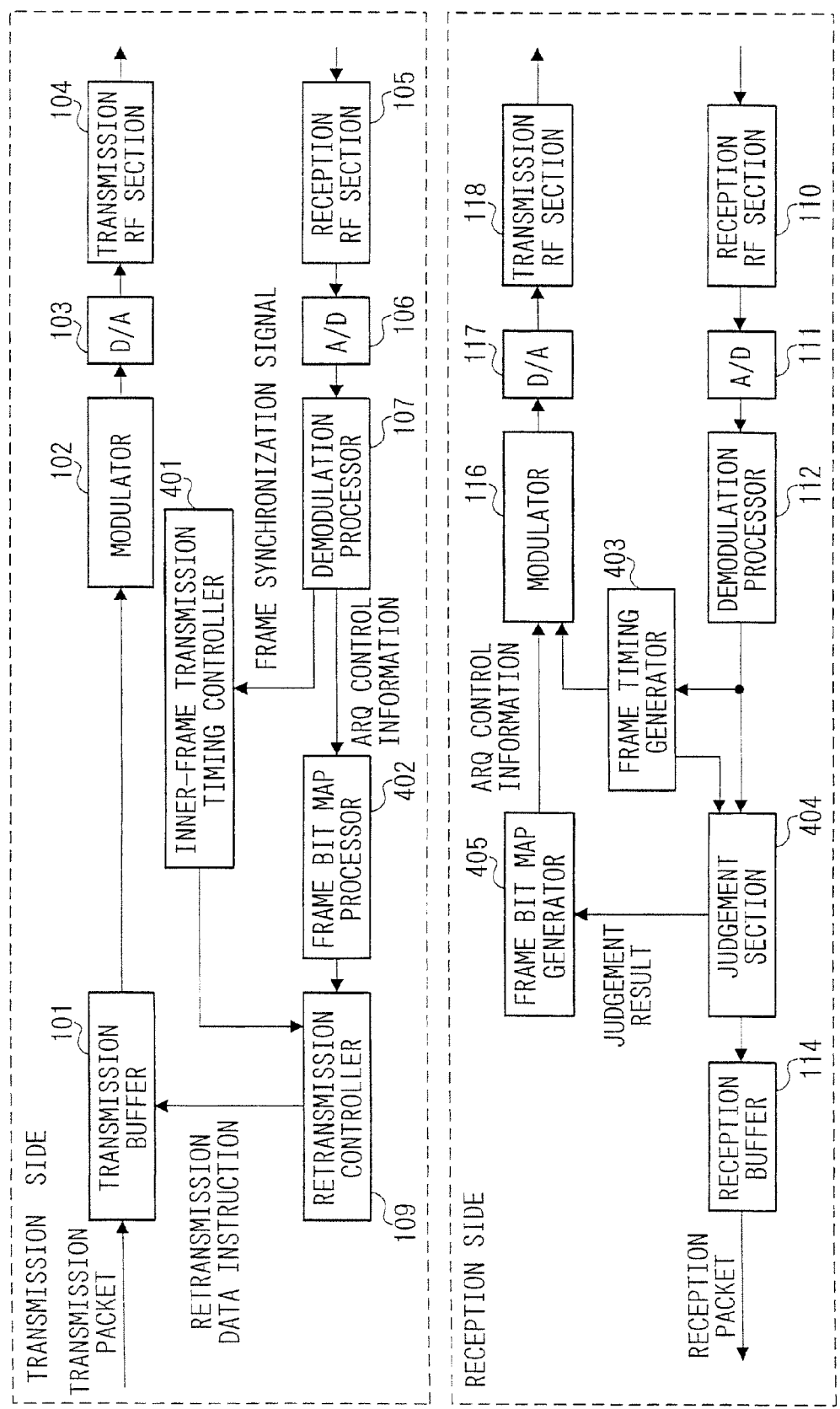
FIG. 6 is a block diagram indicating outline configuration of the transmission-reception apparatus concerning an embodiment 2 of the present invention.
Figure 7:
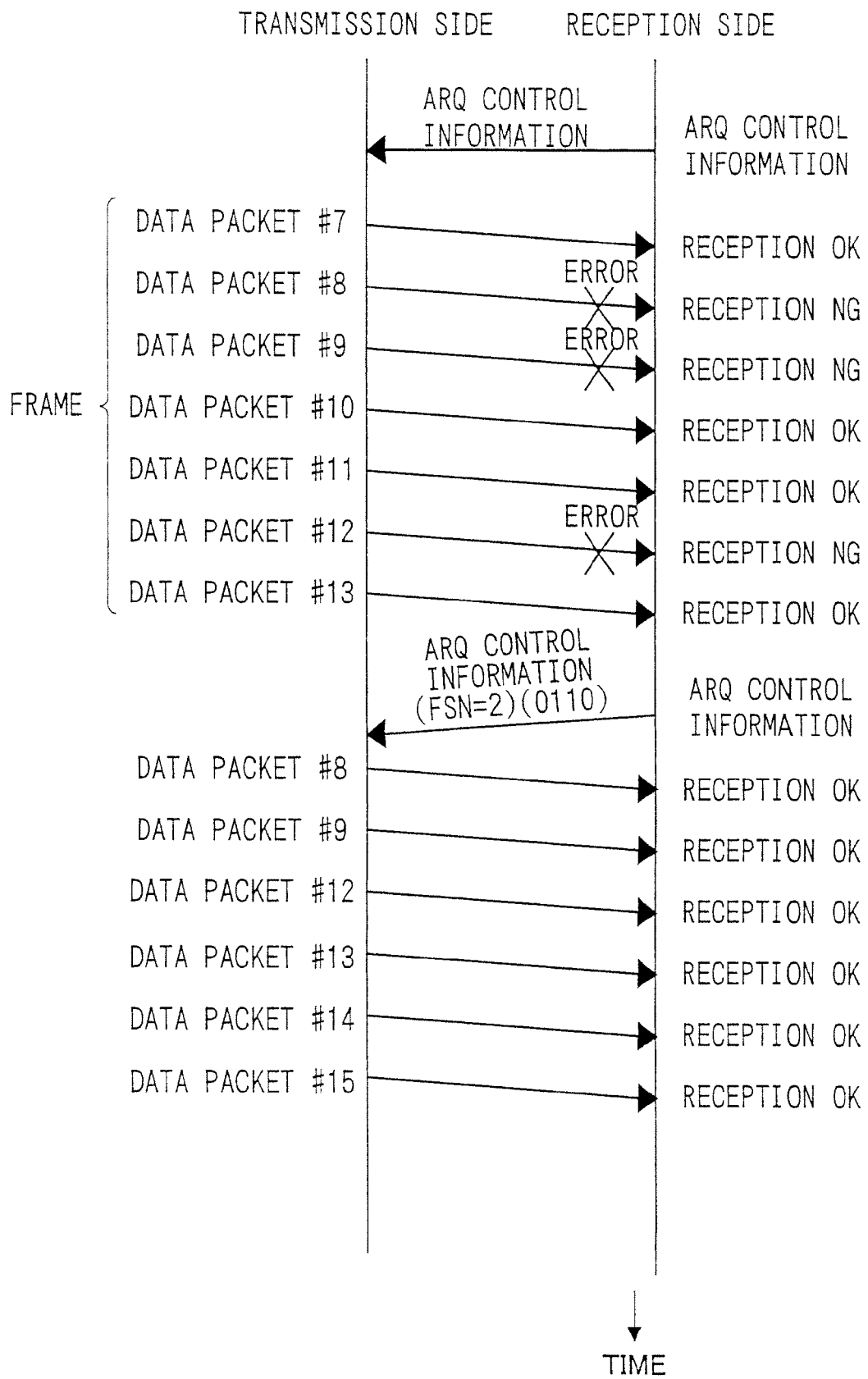
FIG. 7 is an operational diagram indicating one example of a sequence concerning the embodiment 2 of the present invention.
Figure 8:
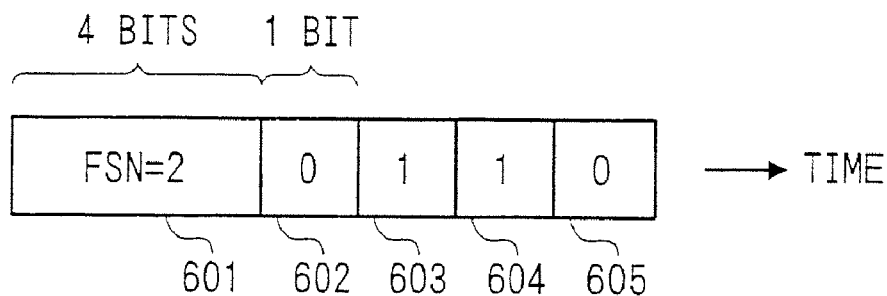
FIG. 8 is a view indicating one configuration example of the ARQ control information concerning the embodiment 2 of the present invention.
Figure 9:
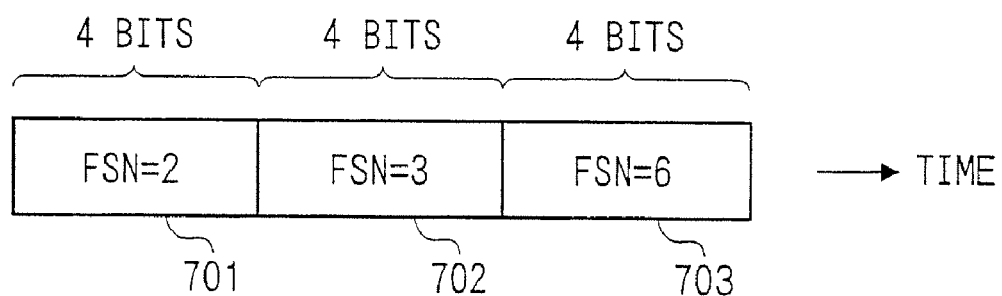
FIG. 9 is a view indicating one configuration example of the ARQ control information concerning the embodiment 2 of the present invention.
Figure 10:
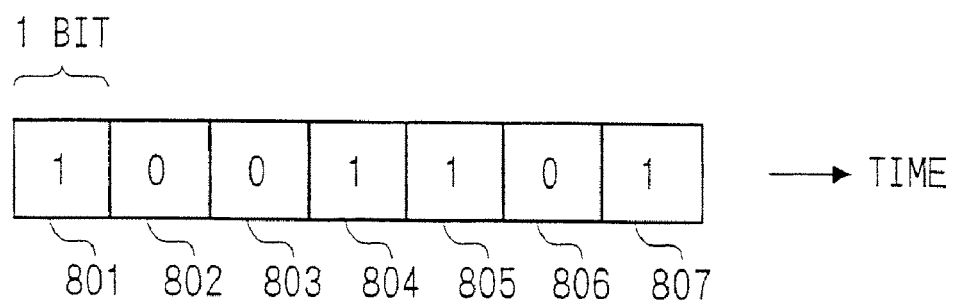
FIG. 10 is a view indicating one configuration example of the ARQ control information concerning the embodiment 2 of the present invention.

Hereinafter, there will be described about the transmission-reception apparatus and the error control method concerning the present embodiment while employing FIG. 6 to FIG. 10. FIG. 6 is a block diagram indicating outline configuration of the transmission-reception apparatus concerning the embodiment 2 of the present invention. FIG. 7 is an operational diagram indicating one example of a sequence concerning the embodiment 2 of the present invention. FIG. 8 to FIG. 10 are views indicating one configuration example of the ARQ control information concerning the embodiment 2 of the present invention respectively. Further, the same sign is added to the same configuration as that of the embodiment 1 to omit detailed description.

The ARQ control information concerning the present embodiment adopts bit configuration as indicated in FIG. 6. A bit group 601 positioned in the beginning of the frame represents FSN (Slot Number in Frame), namely, a slot number indicating position within the frame. Bit 602 to bit 605 indicate existence of error of the slot after slot number represented by the bit group 601.

Here, as indicated in FIG. 7, in transmission of the frame including data packets #7 to #13, error shall occur in the data packets #8, #9, #12. The data packet #8 is positioned within second position in the frame, therefore, the bit group 601 indicates "FNS=2", hereinafter, the bit 602 to the bit 605 which indicate existence of the error of the data packet are positioned within the third position to the sixth position of the frame, thus the bit 602 to the bit 605 successively indicate 0, 1, 1, 0 respectively.

In FIG. 6, the inner-frame transmission timing controller 401 acquires synchronization of the frame as well as the slot from output of the demodulation processor 107 to control the retransmission controller 109. The frame bit map processor 402 finds the packet to be retransmitted while decoding the ARQ control information concerning the present embodiment as indicated in FIG. 8. The frame timing generator 403 acquires synchronization of the frame as well as the slot from output of the demodulation processor 112 to output to the modulator 116.

The judgement section 404 selects the packet to be required retransmission from among the reception signals before communicating to a frame bit map generator 405 described after. The frame bit map generator 405 generates the ARQ control information concerning the present embodiment as indicated in FIG. 8 on the basis of the judgement result of the judgement section 404.

Thus, it is unnecessary to add the SN to transmitting packet or transmitting cell due to employment of the FSN (Slot Number in Frame), therefore, it is capable of reducing transmission quantity of the data itself. Further, since it is capable of reducing about the bit numbers employed for the ARQ control information, the transmission efficiency is improved.

Further, as a method for employing the FSN, as indicated in FIG. 9, thus it renders the ARQ control information capable of a bit configuration including only the FSN. Here, bit group 701 indicates that the error occurs in the packet whose position in the frame is second position, hereinafter, in the same way as above, bit group 702 indicates the error in the third packet, and bit group 703 indicates the error in the sixth packet.

Furthermore, as a method for employing the FSN, in FIG. 8, the FSN shall be always set to 1 (one), further, the method omits the fixed FSN of "FSN=1", thereby, as indicated in FIG. 10, the ARQ control information is capable of being set to bit configuration including only bit indicating existence of the error from the beginning slot within the frame.

Here, a bit 801 indicates that a packet whose position is the first position within the frame is normal reception, a bit 802 indicates that a packet whose position is the second position within the frame, in which the error occurs, hereinafter, in the same way as above, a bit 803 indicates that the third packet is in the error, a bit 804 indicates that the fourth packet is of normal reception, a bit 805 indicates that the fifth packet is of normal reception, a bit 806 indicates that the sixth packet is in the error, and a bit 807 indicates that the seventh packet is of normal reception.

Thus, according to the present embodiment, in the ARQ control information, since the FNS is employed in stead of the SN, less data quantity is required for transmitting the same ARQ control information, therefore, it is capable of improving transmission efficiency.

Moreover, here, a frame is a transmission frame in the TDMA (Time Division Multiple Access) system, a multi transmission frame in the TDMA system, a plurality of data packets, or successive data packet.

Further, a bit group representing the FSN is not limited to 4 bits, any bit numbers is capable of being employed.

EMBODIMENT 3

A transmission-reception apparatus concerning the present embodiment 3 has the same configuration as that of the embodiment 2. However, a frame relative number is added to the ARQ control information as a frame number indicating position of the frame.

In the case where the FSN is employed for the ARQ control information, since the position information within respective frames represents that the error occurs in which packet, it becomes impossible to discriminate whether the position information indicates which frame, when error occurs on the ARQ control information itself as well as retransmission of the ARQ control information is performed.

Accordingly, in the present embodiment, the transmission-reception apparatus adds a frame relative number of PFN (Previous Frame Number) to the ARQ control information employing the FSN. The transmission-reception apparatus can discriminate the information whether the information is how many number of frames before.

Figure 11:
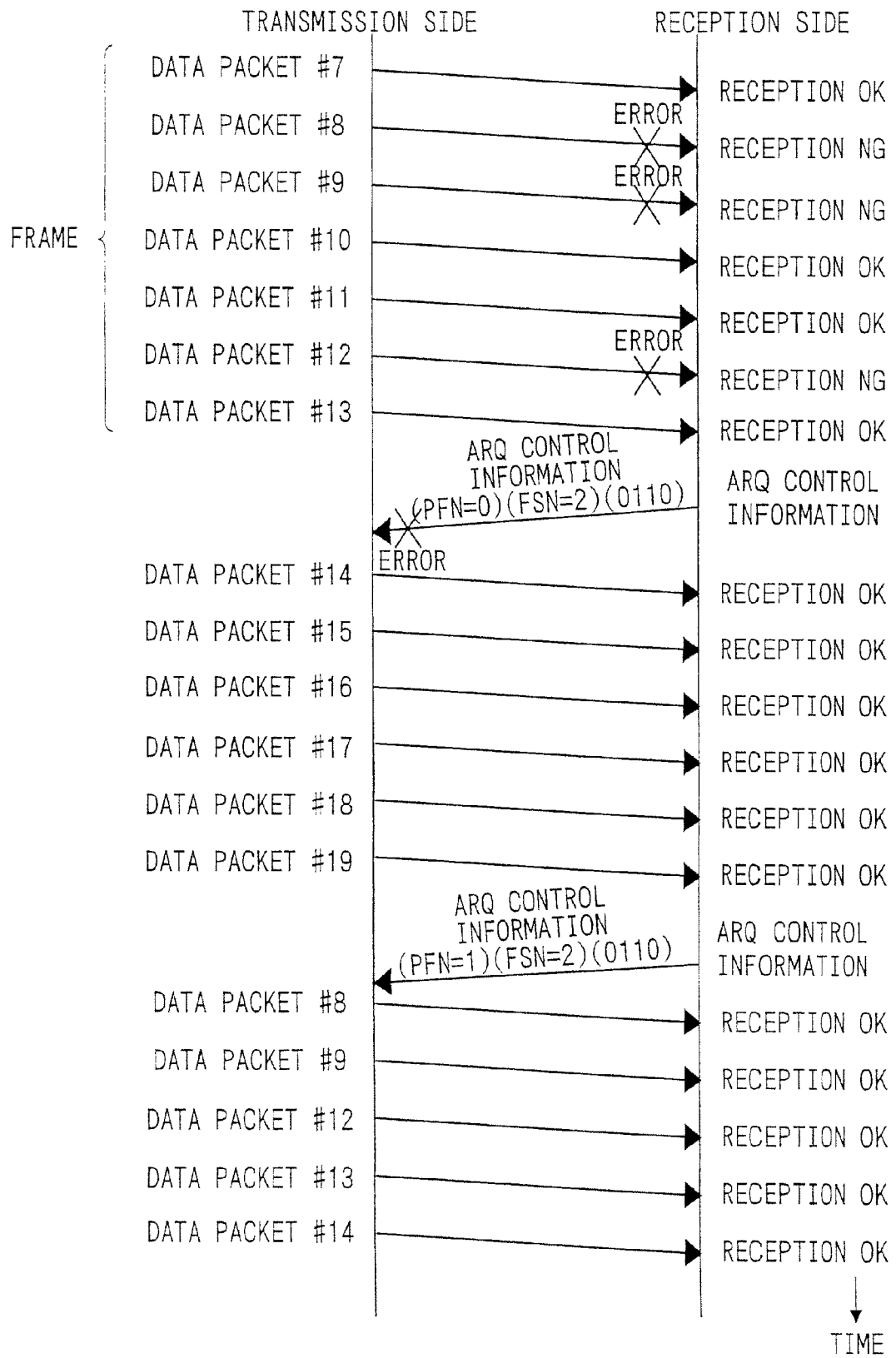
FIG. 11 is an operational diagram indicating one example of a sequence concerning an embodiment 3 of the present invention.
Figure 12:
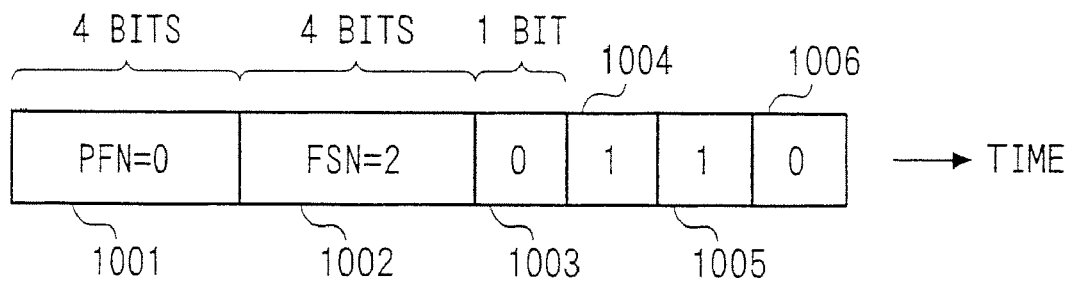
FIG. 12 is a view indicating one configuration example of the ARQ control information concerning the embodiment 3 of the present invention.
Figure 13:
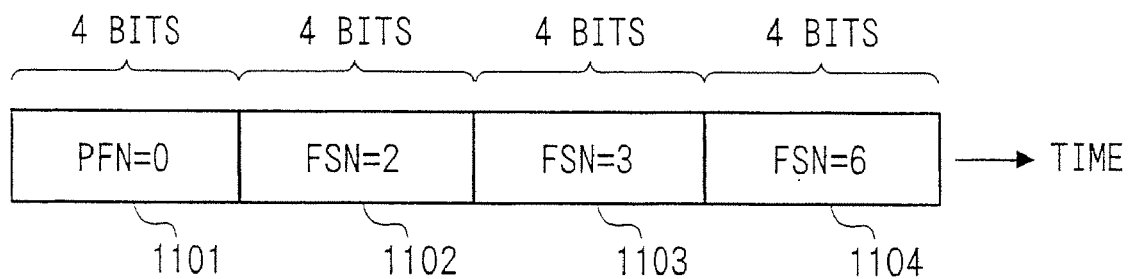
FIG. 13 is a view indicating one configuration example of the ARQ control information concerning the embodiment 3 of the present invention.
Figure 14:
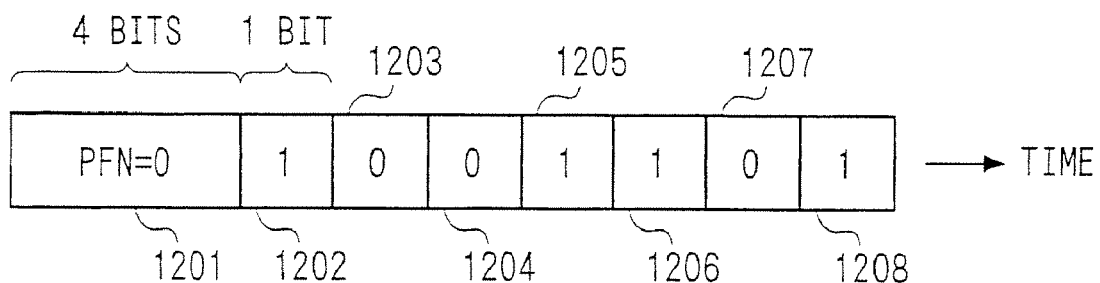
FIG. 14 is a view indicating one configuration example of the ARQ control information concerning the embodiment 3 of the present invention.

Hereinafter, there will be described about the transmission-reception apparatus concerning the present embodiment while employing FIG. 11 to FIG. 14. FIG. 11 is an operational diagram indicating one example of a sequence concerning the embodiment 3 of the present invention. FIG. 12 to FIG. 14 are views indicating one configuration example of the ARQ control information concerning the embodiment 3 of the present invention. Further, the block diagram of the transmission-reception apparatus concerning the present embodiment is the same as the block diagram of the embodiment 2 indicated FIG. 6, therefore, the block diagram of the present embodiment is omitted.

FIG. 11 indicates the case where, in the first frame within the drawing, error occurs in the data packets #8, #9, and #12. The reception side adopts bit configuration of [PFN=0] [FSN=2] [0110] as indicated in FIG. 12 by way of retransmission requirement in this reception state.

In FIG. 12, a bit group 1001 is 0 (zero), namely, PFN=0, that indicates the information concerning the frame immediately in front of the bit group 1001. If the PFN is 1 (one), namely, "PFN=1", bit group is information concerning the frame of one frame before. Hereinafter, in the same way as above, it is indicated that the information concerning the frame is previous frame about temporal order corresponding to numerical value as the numerical value becomes large.

In FIG. 12, a bit group 1002 indicates that error occurs in the packet positioned at the second order within the frame in the same way as the case described previously. A bit 1003 to a bit 1006 indicate existence of error about "FSN=3 to 6", because FSN is 2, namely, "FSN=2".

Returning to FIG. 11, when the error occurs about the ARQ control information concerning the first frame, the reception side retransmits the ARQ control information. On this occasion, [FNS=2] [0110] which are content of the ARQ control information are information concerning the frame of one frame before, therefore, added PFN shall be 1 (one).

Thus, due to employment of the PFN, the transmission side is capable of discriminating whether the ARQ control information is how many frames before.

Further, as a method for employing the FSN as well as PFN, as indicated in FIG. 13 in the same way as FIG. 9, it is capable of making the ARQ control information a bit configuration including only the PFN as well as FSN. Here, a bit group 1101 indicates that the bit group 1101 is information concerning the frame immediately in front thereof, a bit group 1102 indicates that the error occurs in the packet whose position within the frame is second position, hereinafter, in the same way as above, bit group 1103 indicates the error in the third packet, and bit group 1104 indicates the error in the sixth packet.

Furthermore, as a method for employing the FSN as well as PFN, as indicated in FIG. 14 in the same way as FIG. 8, the FSN shall be always set to 1 (one), further, the method omits the fixed FSN of "FSN=1", thereby, as indicated in FIG. 14 in the same way as FIG. 10, the ARQ control information is capable of being set to bit configuration including only bit indicating existence of error from the PFN as well as the beginning slot within the frame.

Here, a bit group 1201 indicates that the bit group 1201 is the information about the frame immediately in front thereof, a bit 1202 indicates that a packet whose position is the first position within the frame, is normal reception, a bit 1203 indicates that a packet whose position is the second position within the frame, in which the error occurs, hereinafter, in the same way as above, a bit 1204 indicates that the third packet is in the error, a bit 1205 indicates that the fourth packet is of normal reception, a bit 1206 indicates that the fifth packet is of normal reception, a bit 1207 indicates that the sixth packet is in the error, and a bit 1208 indicates that the seventh packet is of normal reception.

Thus, according to the present embodiment, in the case where the transmission-reception apparatus communicates about the packet in which the error occurs by the position information within the frame while employing the FNS for the ARQ control information, the reception side employs the PFN to be the frame relative number for the ARQ control information, thereby, even though when the error occurs in a plurality of ARQ control information, the transmission side is capable of discriminating simply whether the ARQ control information is how many number of frames before, accordingly, appropriate retransmission can be performed.

Moreover, here, a frame is a transmission frame in the TDMA (Time Division Multiple Access) system, a multi transmission frame in the TDMA system, a plurality of data packets, or successive data packet.

Further, a bit group representing the FSN as well as a bit group representing PFN is not limited to 4 bits, any bit numbers is capable of being employed.

EMBODIMENT 4

A transmission-reception apparatus and an error control method concerning the present embodiment has the same configuration as that of the embodiment 3. However, in this particular case, the transmission-reception apparatus employs a frame absolute number instead of the frame relative number as the frame number indicating position of the frame.

When the transmission-reception apparatus employs the frame relative number as indicated in the embodiment 3, the problem occurs that processing becomes complicated when the error occurs in a plurality of ARQ control information.

For that reason, in the present embodiment, the transmission-reception apparatus employs identification number employed for frame synchronization acquisition as a frame absolute number, namely, FRN (Frame Number) instead of the PFN.

The frame identification number, usually, is represented, for instance, hexadecimal value of 0 to 15. If the numerical value to be adopted is limited to the hexadecimal value, a bit group representing the frame identification number is enough to be represented by only 4 bits.

Figure 15:
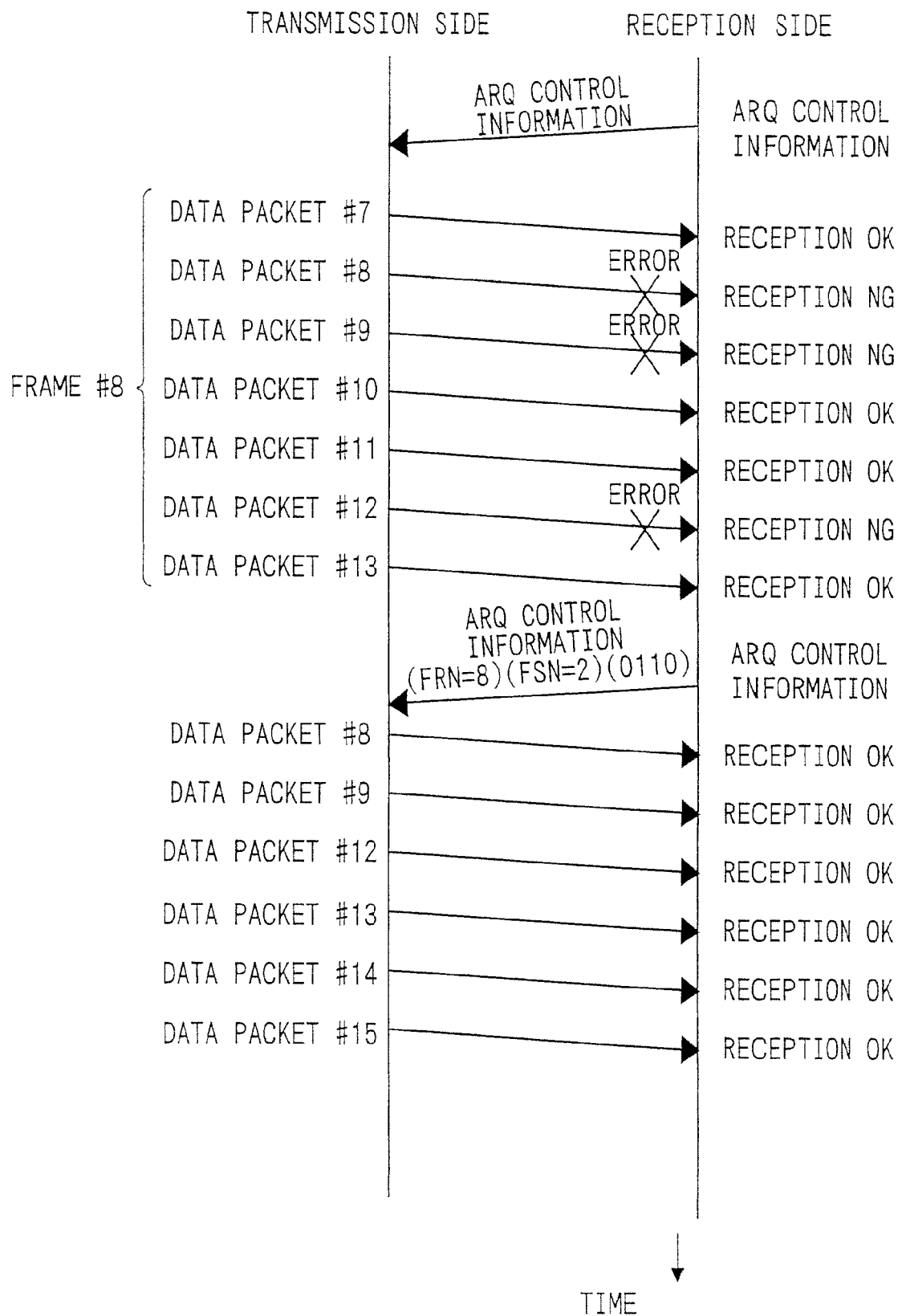
FIG. 15 is an operational diagram indicating one example of an embodiment 4 of the present invention.
Figure 16:
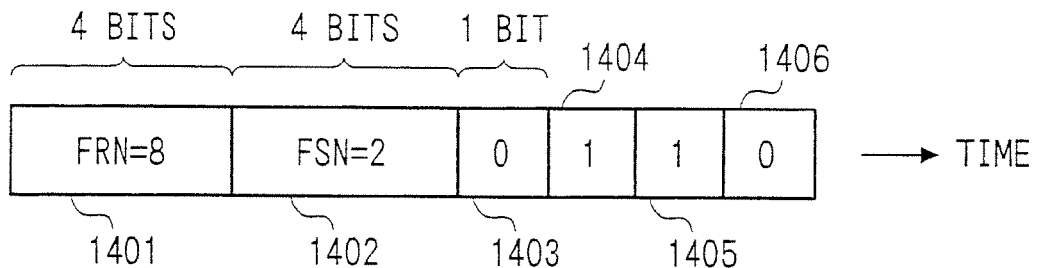
FIG. 16 is a view indicating one configuration example of the ARQ control information concerning the embodiment 4 of the present invention.
Figure 17:
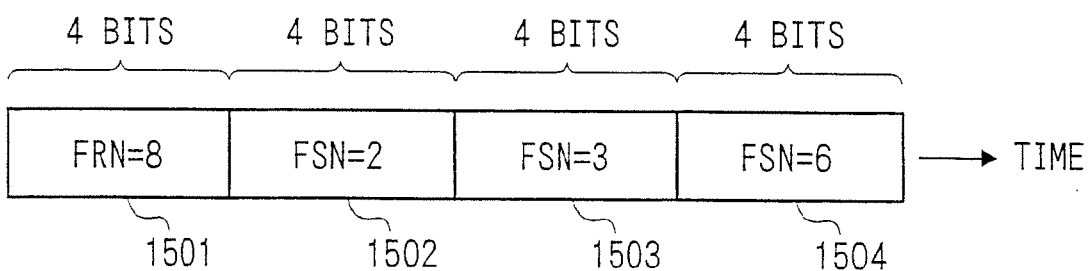
FIG. 17 is a view indicating one configuration example of the ARQ control information concerning the embodiment 4 of the present invention.
Figure 18:
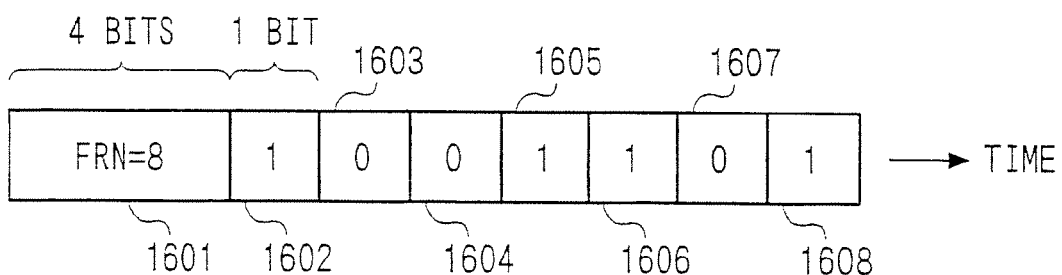
FIG. 18 is a view indicating one configuration example of the ARQ control information concerning the embodiment 4 of the present invention.

Hereinafter, there will be described the transmission-reception apparatus and the error control method concerning the present embodiment while employing FIG. 15 to FIG. 18. FIG. 15 is an operational diagram indicating one example of the embodiment 4 of the present invention. FIG. 16 to FIG. 18 are views indicating one configuration example of the ARQ control information concerning the embodiment 4 of the present invention respectively. Further, the block diagram of the transmission-reception apparatus concerning the present embodiment is the same as the block diagram concerning the embodiment 2 indicated in FIG. 6, therefore, the block diagram concerning the present embodiment is omitted here.

In FIG. 15, an identification number of the first frame shall be 8 in the drawing. In this reception of the frame, FIG. 15 indicates the case where the error occurs in the data packets #8, #9, and #12. The reception side adopts bit configuration of [FRN=8] [FSN=2] [0110] by way of retransmission requirement in this reception state as indicated in FIG. 16.

In FIG. 16, a bit group 1401 being 8 indicates information concerning the frame whose identification number is 8. A bit group 1402 indicates that the error occurs in the packet positioned in the second order within the frame in the same way as the case described previously. A bit 1403 to a bit 1406 indicate existence of the error about "FSN=3 to 6" because the FNS is 2, namely, "FSN=2".

Thus, according to employment of the FRN, even though when the error occurs in a plurality of the ARQ control information, the transmission side is capable of discriminating easily whether the ARQ control information with error is how many frames before. Further, a few bit numbers of bit group are enough for representing the FRN in comparison with bit numbers of the bit group representing the PFN.

Further, as a method for employing the FSN as well as the FRN, as indicated in FIG. 17 in the same way as FIG. 9, it renders the ARQ control information capable of a bit configuration including only the FRN as well as the FSN. Here, a bit group 1501 indicates information concerning the frame whose identification number is 8, a bit group 1502 indicates that the error occurs in the packet whose position in the frame is second position, hereinafter, in the same way as above, a bit group 1503 indicates the error in the third packet, and bit group 1504 indicates the error in the sixth packet.

Furthermore, as a method for employing the FSN as well as the FRN, in the same way as FIG. 10, the FSN shall be always set to 1 (one), further, the method omits the fixed FSN of "FSN=1", thereby, as indicated in FIG. 18, the ARQ control information is capable of being set to bits configuration including only bits indicating existence of error from the FRN as well as the beginning slot within the frame.

Here, a bit group 1601 indicates information about the frame whose identification number is 8, a bit 1602 indicates that a packet whose position is the first position within the frame is normal reception, a bit 1603 indicates that a packet whose position is the second position within the frame, in which the error occurs, hereinafter, in the same way as above, a bit 1604 indicates that the third packet is in the error, a bit 1605 indicates that the fourth packet is of normal reception, a bit 1606 indicates that the fifth packet is of normal reception, a bit 1607 indicates that the sixth packet is in the error, and a bit 1608 indicates that the seventh packet is of normal reception.

Thus, according to the present embodiment, the transmission-reception apparatus communicates the packet in which the error occurs by means of the position information within the frame while employing the FNS for the ARQ control information. Since the reception side employs the FRN to be the frame absolute number for the ARQ control information, the transmission side is capable of discriminating easily whether the ARQ control information with the error is which frame, even though when the error occurs in a plurality of the ARQ control information. Thus, appropriate retransmission can be performed.

Moreover, here, a frame is a transmission frame in the TDMA (Time Division Multiple Access) system, a multi transmission frame in the TDMA system, a plurality of data packets, or successive data packet.

Further, a bit group representing the FSN as well as a bit group representing FRN is not limited to 4 bits, any bit numbers is capable of being employed.

EMBODIMENT 5

A transmission-reception apparatus and an error control method concerning the present embodiment have the same configuration as that of the embodiment 1. However, in this particular case, low order bit of a bit group which represents the SN with binary number is omitted to reduce numbers of bit employed for the ARQ control information.

Figure 19:
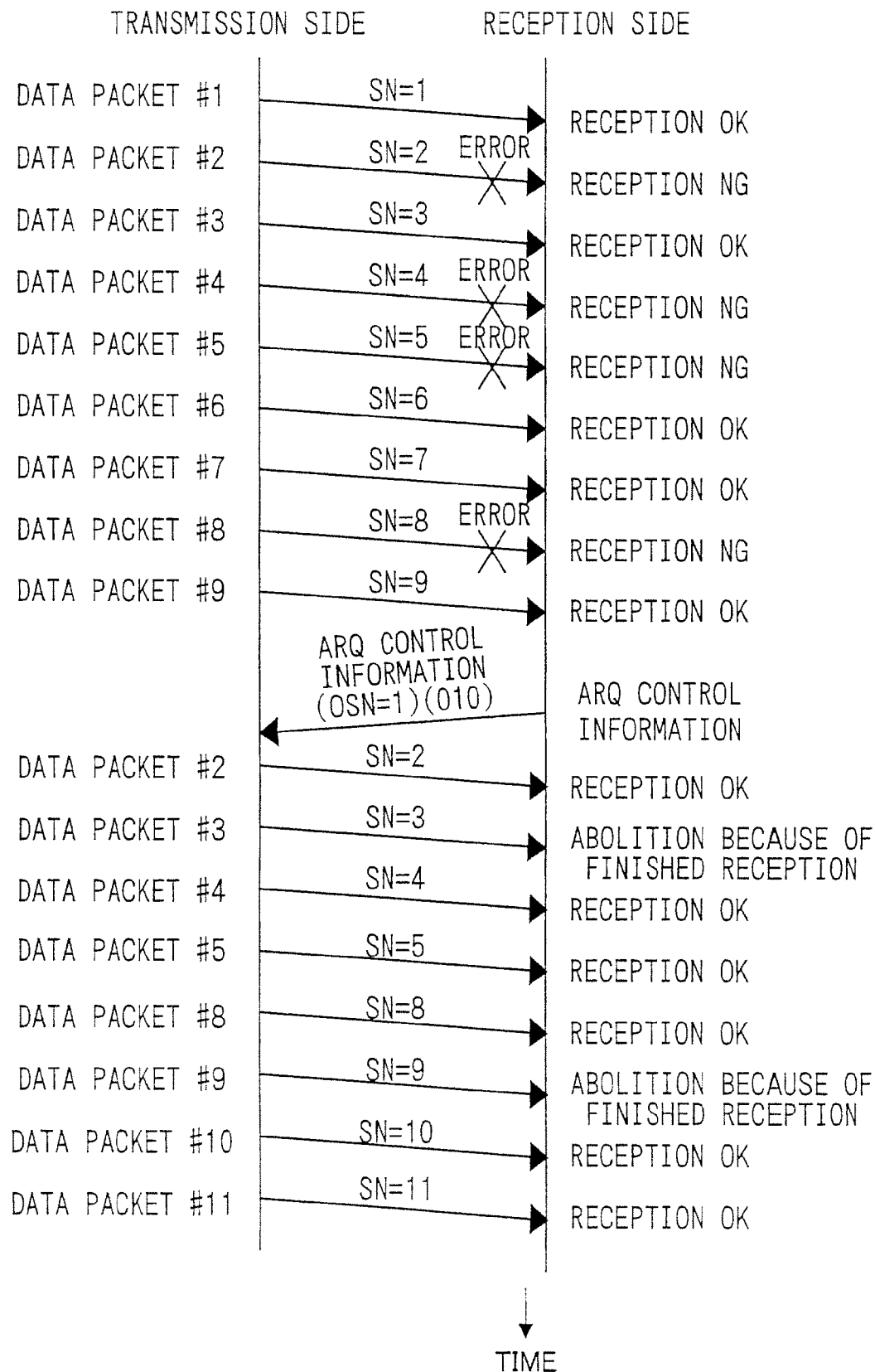
FIG. 19 is an operational diagram indicating one example of a sequence concerning an embodiment 5 of the present invention.
Figure 20:
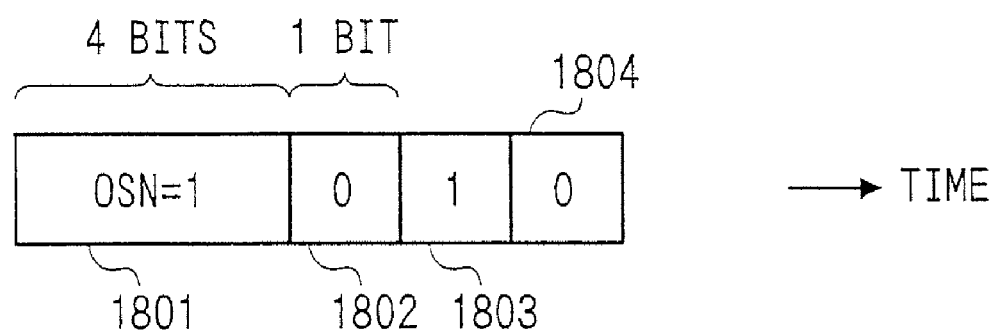
FIG. 20 is a view indicating one configuration example of the ARQ control information concerning the embodiment 5 of the present invention.
Figure 21:
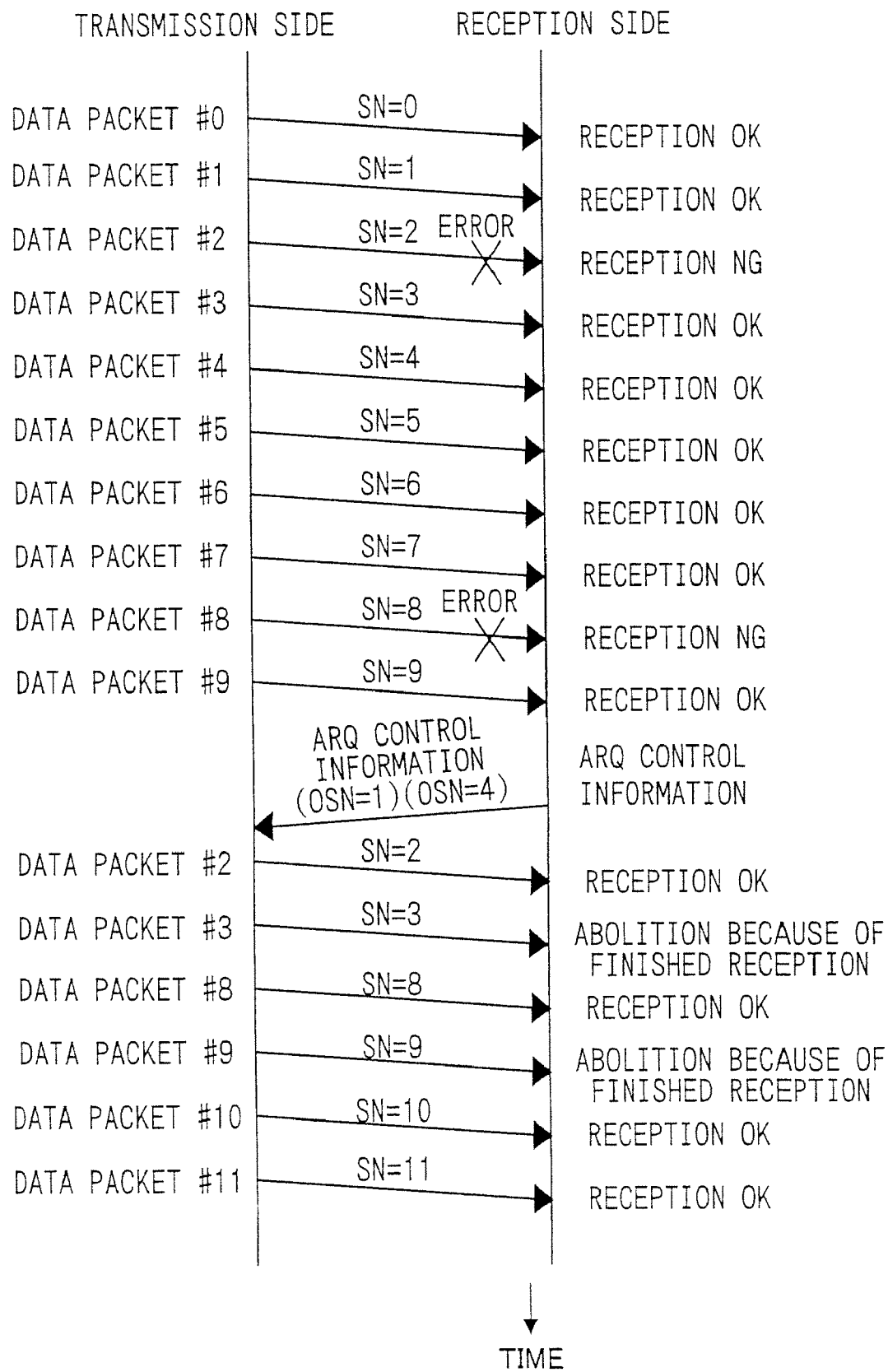
FIG. 21 is an operational diagram indicating one example of a sequence concerning an embodiment 5 of the present invention.
Figure 22:
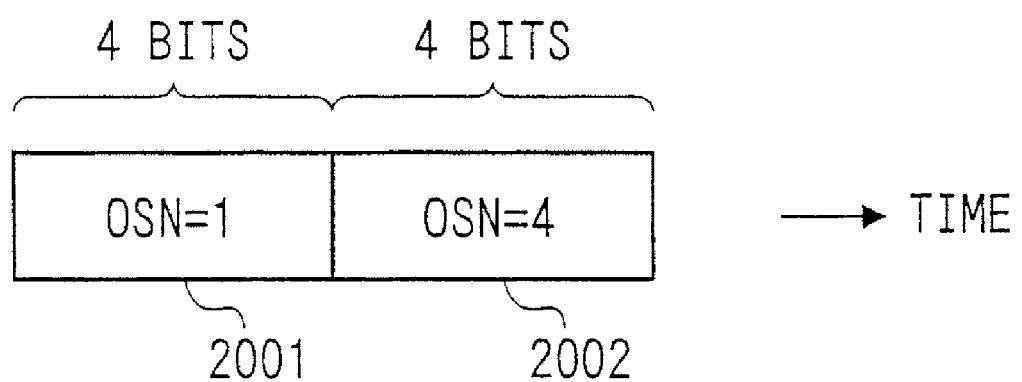
FIG. 22 is a view indicating one configuration example of the ARQ control information concerning the embodiment 5 of the present invention.

Hereinafter, a transmission-reception apparatus and an error control method concerning the present embodiment will be described while employing FIG. 19 to FIG. 22. FIG. 19 and FIG. 21 are operational diagrams indicating one example of a sequence concerning the embodiment 5 of the present invention. FIG. 20 as well as FIG. 22 are views indicating one configuration example of the ARQ control information concerning the embodiment 5 of the present invention. Further, the block diagram of the transmission-reception apparatus concerning the present embodiment is the same as the block diagram concerning the embodiment 2 indicated in FIG. 6, therefore, the block diagram of the present embodiment is omitted here.

FIG. 19 indicates the case where the error occurs in the data packets #2, #4, #5, and #8 in the first frame as illustrated. The reception side adopts bit configuration of [OSN=1] [010] as indicated in FIG. 20 by way of retransmission requirement in this reception state.

Here, the OSN (Omitted Sequence Number) is a value represented with the decimal number when low order bit is omitted while the SN is represented with the binary number.

In the present embodiment, the first bit to be the lowest order bit is omitted. For instance, "SN=2" is {10} while being represented by binary number. When the first bit of {10} is omitted, {10} comes into {1}. Such {1} comes into "OSN (Omitted Sequence Number)=1" while being represented by decimal number. Further, for instance, "SN=8" is {1000} while being represented by binary number. When the first bit of {1000} is omitted, {1000} comes into {100}. Such {100} comes into "OSN=4" while being represented by decimal number. Namely, the "OSN=1" represents both of "SN=22" and "SN=3", as well as the "OSN=4", represents both of "SN=8" and "SN=9".

In FIG. 20, a bit group 1801 is 1 (one). This indicates that the error occurs at least one of "SN=2" and "SN=3". A bit 1802 to a bit 1804 represent respective "OSN=2 to 4" because the OSN is 1 (one), namely, "OSN=1" in the bit group 1801. The bit 1802 is 0 (zero), therefore, the bit 1802 indicates that the error occurs at least one of "SN=4" and "SN=5". The bit 1803 is 1 (one), therefore, the bit 1803 indicates that both of "SN=6" and "SN=7" are performed reception with normal reception. The bit 1804 is 0 (zero), therefore, the bit 1804 indicates that the error occurs at least one of "SN=8", and "SN=9".

Returning to FIG. 19, the transmission side which has received the ARQ control information concerning the first frame, retransmits about "SN=2, 4, 5, 8, 9" instructed by the ARQ control information indicated in FIG. 20. The reception side discards about "SN=3" and "SN=9", because "SN=3" and "SN=9" are already received in the condition of normal reception.

Thus, since it is capable of reducing the bit number employed for the ARQ control information according to employment of the OSN, consequently, transmission efficiency is improved.

Further, as indicated in FIG. 22, in the same way as FIG. 9, thus it renders the ARQ control information capable of a bit configuration consisting of only the OSN by way of method for employing the OSN.

For instance, as one example of a sequence indicated in FIG. 21, when the error occurs about "SN=2" as well as "SM=8" in the first frame, the reception side transmits [OSN=1] [OSN=4] by way of the ARQ control information.

In FIG. 22, a bit group 2001 indicates that the error occurs in at least one of "SN=2" and "SN=3", as well as a bit group 2002 indicates that the error occurs in at least one of "SN=8" and "SN=9". Consequently, the transmission side which has received the ARQ control information retransmits "SN=2, 3, 8, 9". The reception side discards "SN=3" and "SN=9" because "SN=3" and "SN=9" have already received in the condition of normal reception.

Thus, according to the present embodiment, in the ARQ control information, less a few data quantity is enough for transmitting the same ARQ control information by employing the OSN instead of the SN, accordingly, it is capable of improving the transmission efficiency. In particular, it is capable of transmitting continuous SN at a time, therefore, it is more effective in the condition that the error continues.

Further, in the present embodiment, there is described about the case where the number of bit to be omitted is 1 (one), however, it is unnecessary to be limited to the above case, namely, the omitted bit is 1 (one), it is also suitable that the number of low order bit not less than 2 are omitted. The larger the number of bit is to omit, the larger it is capable of transmitting continuous SN at a time, therefore, it is more effective in the condition that the error continues.

Moreover, here, a frame is a transmission frame in the TDMA (Time Division Multiple Access) system, a multi transmission frame in the TDMA system, a plurality of data packets, or successive data packet.

Further, a bit group representing the OSN as well as a bit group representing FRN is not limited to 4 bits, any bit numbers is capable of being employed.

EMBODIMENT 6

A transmission-reception apparatus and an error control method concerning the present embodiment has the same configuration as that of the embodiment 5. However, the transmission-reception apparatus is capable of changing the number of bit to be omitted during communication.

Figure 23:
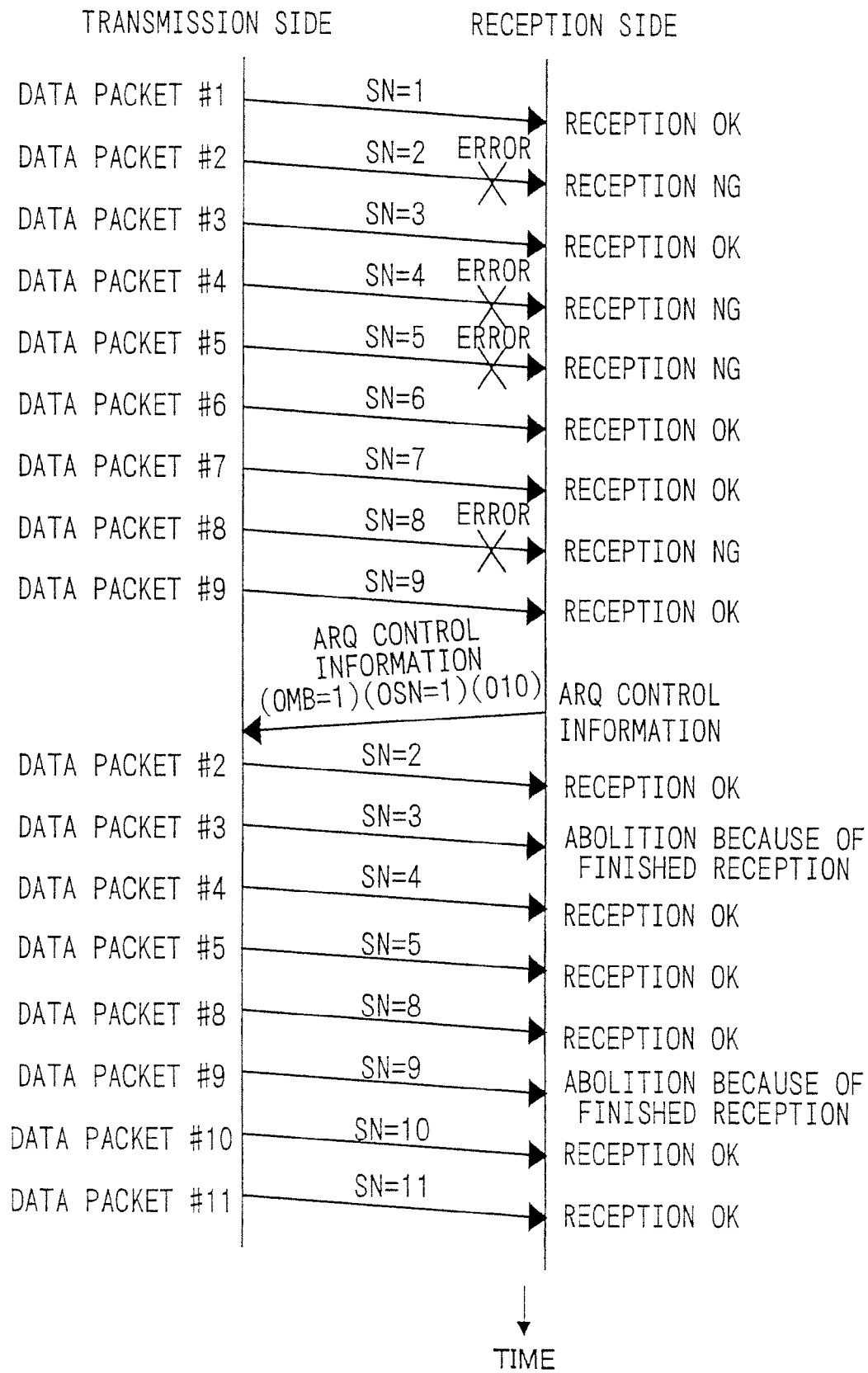
FIG. 23 is an operational diagram indicating one example of a sequence concerning an embodiment 6 of the present invention.
Figure 24:
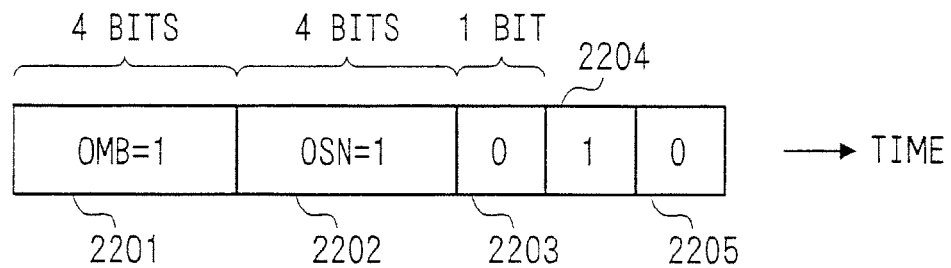
FIG. 24 is a view indicating one configuration example of the ARQ control information concerning the embodiment 6 of the present invention.

Hereinafter, there will be described about the transmission-reception apparatus and the error control method concerning the present embodiment while employing FIG. 23 to FIG. 25. FIG. 23 is an operational diagram indicating one example of a sequence concerning the embodiment 6 of the present invention. FIG. 24 and FIG. 26 are views indicating one configuration example of the ARQ control information concerning the embodiment 6 of the present invention. Further, the block diagram of the transmission-reception apparatus concerning the present embodiment is the same as the block diagram concerning the embodiment 2 indicated in FIG. 6, therefore, the block diagram thereof is omitted here.

In the embodiment 5, there has been described the case where the number of bit of low order bit determined beforehand is omitted when the SN is represented by binary number. However, in the present embodiment, it causes the omitted number of bit of the low order bit to be variable adaptively during communication in order to scheme more improvement of the transmission efficiency.

FIG. 23 indicates the case where the error occurs in the data packets #2, #4, as well as #5 in the frame within the drawing. The reception side adopts bit configuration of [OMB=1] [OSN=1] [010] as indicated in FIG. 24 by way of retransmission requirement in this reception condition. Here, OMB (Omitted Bits) is a value indicating whether how many bits of low order bit of the SN represented by binary number is omitted.

For instance, if the OMB is "OMB=2", 2 bits of low order bit are omitted. If the OSN is "OSN=1", the "OSN=1" represents "SN=4 to 7".

In FIG. 24, a bit group 2201 is 1 (one), thus, indicating that one bit of the low order bit is omitted. A bit group 2202 is 1 (one), thus, indicating "SN=2" and "SN=3". A bit 2202 to a bit 2205 represent respective "OSN=2 to 4". The bit 2202 is 0 (zero), thus indicating that the error occurs in at least one of "SN=4" and "SN=5". The bit 2204 is 1 (one), thus, indicating that both of "SN=6" and "SN=7" are received in the condition of normal reception. The bit 2205 is 0 (zero), thus, indicating that the error occurs in at least one of "SN=8" and "SN=9".

Returning to FIG. 23, the transmission side which has received the ARQ control information concerning the first frame, retransmits about "SN=2, 3, 4, 5, 8, 9," instructed by the ARQ control information indicated in FIG. 24. The reception side discards about "SN=3" and "SN=9" which are already received in the condition of normal reception.

Thus, it is capable of reducing the number of bit employed in the ARQ control information by employing the OMB as well as the OSN, therefore, the transmission efficiency is improved.

Figure 25:
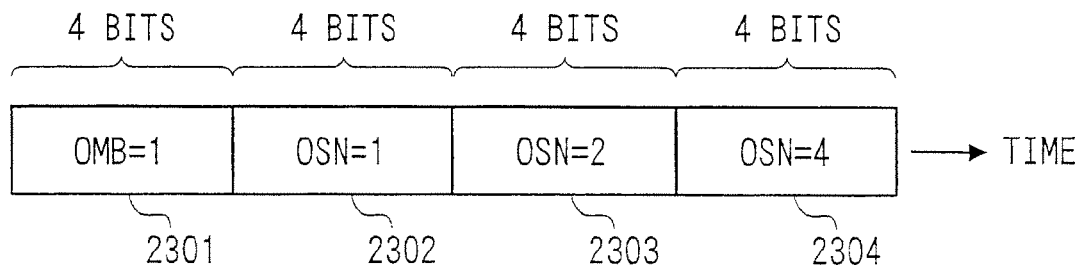
FIG. 25 is a view indicating one configuration example of the ARQ control information concerning the embodiment 6 of the present invention.
Figure 26:
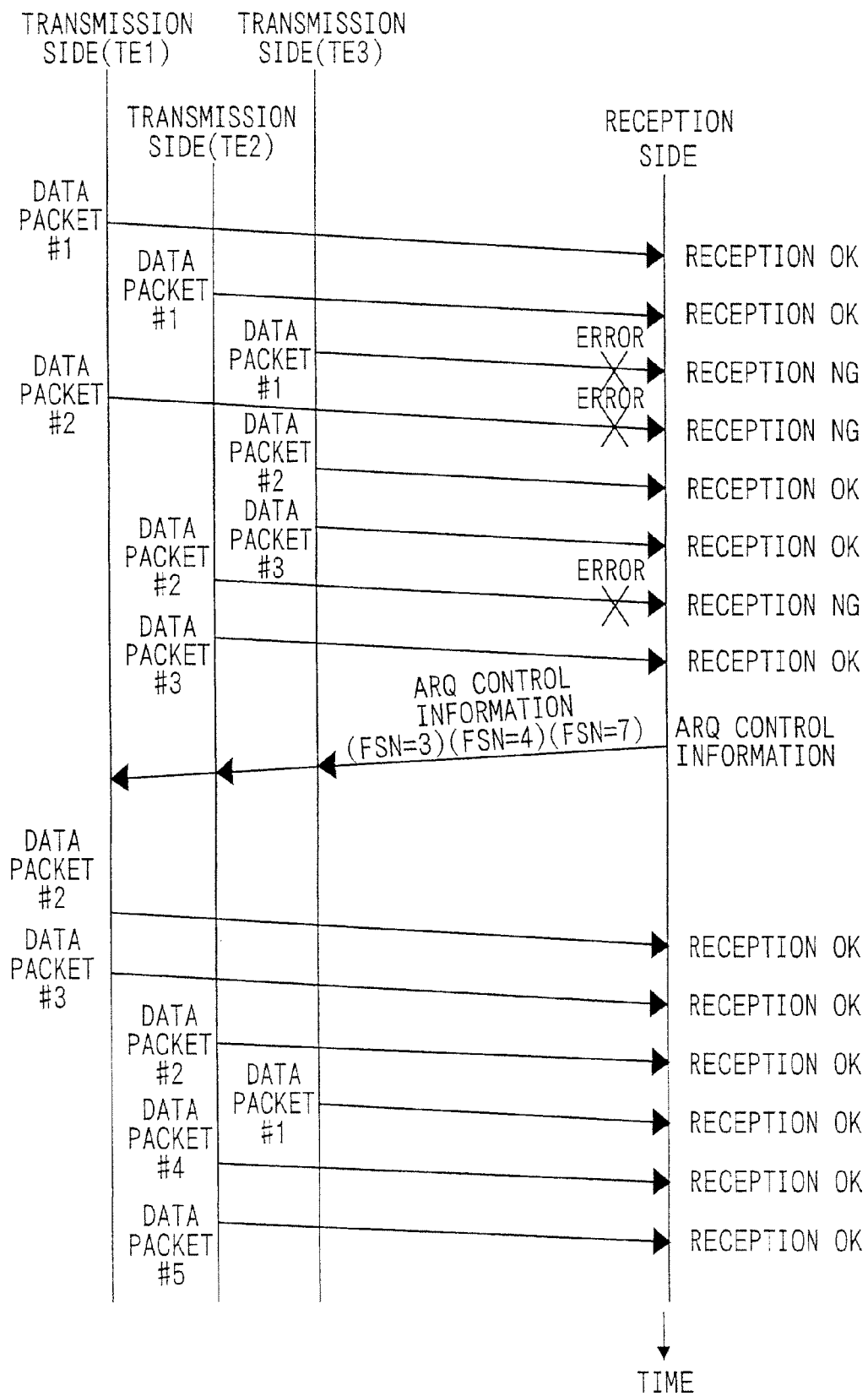
FIG. 26 is an operational diagram indicating one example of a sequence concerning an embodiment 7 of the present invention.

Further, by way of a method for employing the OMB as well as the OSN, as indicated in FIG. 25, in the same way as FIG. 22, thus it renders the ARQ control information capable of a bit configuration consisting of only the OSN.

In FIG. 25, a bit group 2301 indicates that omitted number of bit of low order bit is 1 (one). A bit group 2302 indicates that the error occurs in at least one of "SN=2" and "SN=3". A bit group 2303 indicates that the error occurs in at least one of "SN=4" and "SN=5". A bit group 2304 indicates that the error occurs in at least one of "SN=8" and "SN=9".

Accordingly, the transmission side which has received this ARQ control information retransmits "SN=2, 3, 4, 5, 8, 9". The reception side discards "SN=3" and "SN=9" because "SN=3" and "SN=9" are already received in condition of normal reception.

Thus, according to the present embodiment, in the ARQ control information, the transmission-reception apparatus employs the OSN instead of the SN, further enabling the omitted number of bit to be variable adaptively during communication, furthermore by communicating omitted numbers of bit to the transmission side while employing the OMB, therefore, it is capable of further improving the transmission efficiency. In particular, the larger the number of bit is to omit, the larger it is capable of transmitting continuous SN at a time, therefore, it is more effective in the condition that the error continues.

Moreover, here, a frame is a transmission frame in the TDMA (Time Division Multiple Access) system, a multi transmission frame in the TDMA system, a plurality of data packets, or successive data packet.

Further, a bit group representing the OSN as well as a bit group representing OMB is not limited to 4 bits, any bit numbers is capable of being employed.

EMBODIMENT 7

A transmission-reception apparatus and an error control method concerning the present embodiment have the same configuration as that of the embodiment 2. However, in this particular case, when the transmission-reception apparatus performs communication to a plurality of communication remote stations, the transmission-reception apparatus transmits the ARQ control information by common channel.

Figure 27:
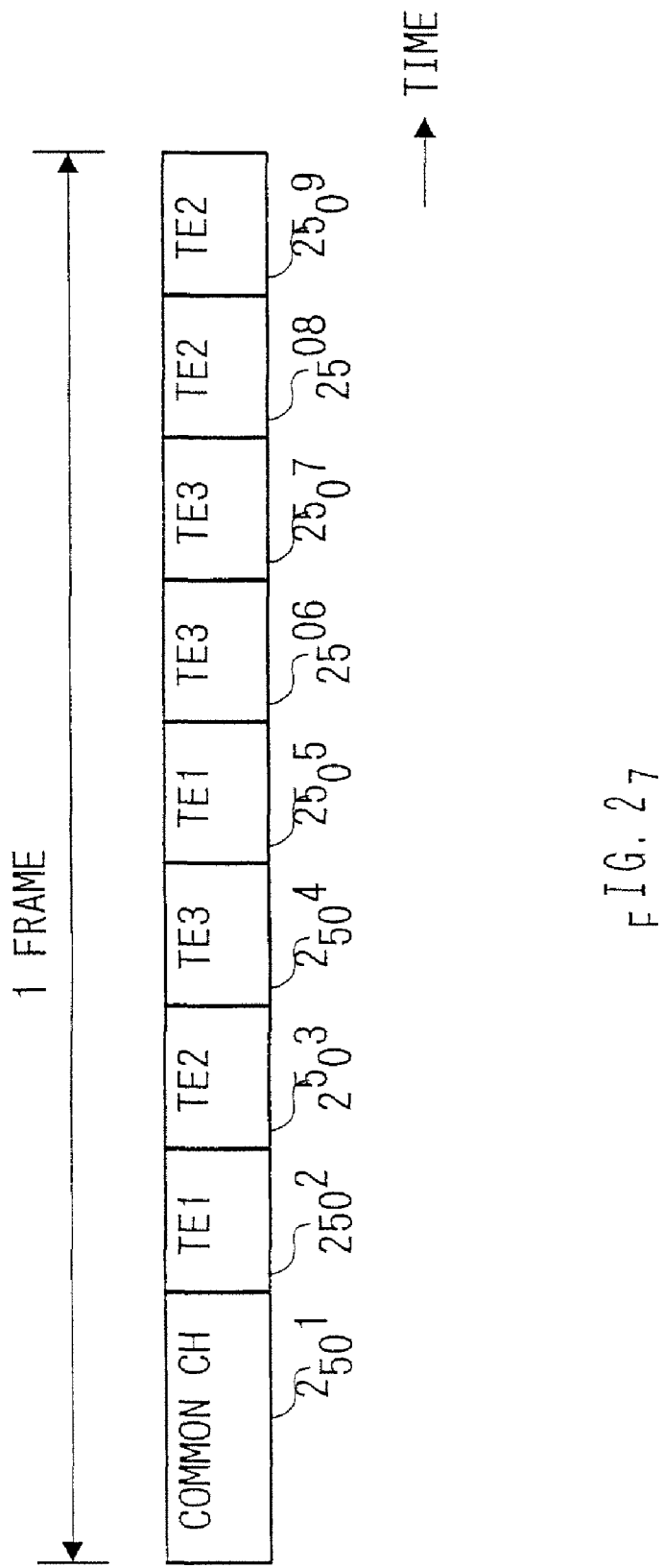
FIG. 27 is a configuration view indicating one configuration example of a communication frame concerning an embodiment 7 of the present invention.

Hereinafter, there will be described about the transmission-reception apparatus and the error control method concerning the present embodiment while employing FIG. 26 and FIG. 27. FIG. 26 is an operational diagram indicating one example of a sequence concerning the embodiment 7 of the present invention. FIG. 27 is a configuration view indicating one configuration example of a communication frame concerning the embodiment 7 of the present invention. Further, the block diagram of the transmission-reception apparatus concerning the present embodiment is the same as the block diagram concerning the embodiment 2 indicated FIG. 6, therefore, the block diagram of the present embodiment is omitted.

In the present embodiment, the reception side is a base station, while the transmission side is a plurality of communication terminal equipment (TE1 to 3).

In the present embodiment, the error control which has been performed in every channel (in every communication equipment) is performed by employing common channel, thereby, respective communication terminal equipment can receive the common ARQ control information from the base station. Consequently, the data quantity for transmission-reception is reduced, thus, the transmission efficiency is improved.

In FIG. 26, in the base station to be the reception side, the error is detected about a packet #1 from a TE3 to be the third packet within the first frame, about a packet #2 from a TE1 to be the fourth packet within the first frame, and about a packet #2 from a TE2 to be the seventh packet within the first frame.

Then, the base station transmits the ARQ control information [FSN=3] [FSN=4] [FSN=7] while employing the common channel. The respective communication terminal equipment receive the ARQ control information, before retransmitting a packet existing in the instructed position within the frame.

FIG. 27 indicates one example of a slot configuration within one frame. A common channel 2501 is allocated in the beginning of one frame. FIG. 27 indicates that slots 2502 and 2505 are employed for the TE1, slots 2503, 2508, and 2509 are employed for the TE2, slots 2504, 2506, and 2507 are employed for the TE3.

Thus, according to the present embodiment, since the base station to be the reception side does not need to transmit the ARQ control information in every communication remote station, it is capable of improving the transmission efficiency.

Further, in the present embodiment, there have been described about the case where the ARQ control information adopts the bit configuration indicated in FIG. 9. However, in the present embodiment, the ARQ control information which the reception side performs broadcast from the common channel is suitable to be employed in any configuration of the ARQ control information from among the embodiments described previously.

EMBODIMENT 8

A transmission-reception apparatus and an error control method concerning the present embodiment have the same configuration as that of the embodiment 1. However, in this particular case, the transmission-reception apparatus adds the same SN to the packet within prescribed data unit.

The data unit on the occasion of the data processing is not always in agreement with the data unit on the occasion of transmission-reception. For instance, the practical packet on the occasion of transmission-reception is the data unit on the occasion of transmission-reception, usually, a data unit does become effective data unit on the occasion of data processing when a plurality of packets collect.

Accordingly, if the error occurs even one packet within the data unit on the occasion of the data processing, the normal data processing can not be performed. All of the packet configuring the data unit on the occasion of such the data processing is discarded even though the data packet received normally is included.

Consequently, if the SN is added in every packet, in the case where even though the error occurs on any packet within the data unit on the occasion of the data processing, the transmission-reception apparatus performs retransmission requirement about the whole packets configuring the data unit on the occasion of this data processing, the transmission-reception apparatus must instruct about the SN added to the whole packets to transmission source.

So, in the present embodiment, the SN which has been added to in every packet shall be added to in every data unit which is upper order on the occasion of the data processing.

Figure 28:
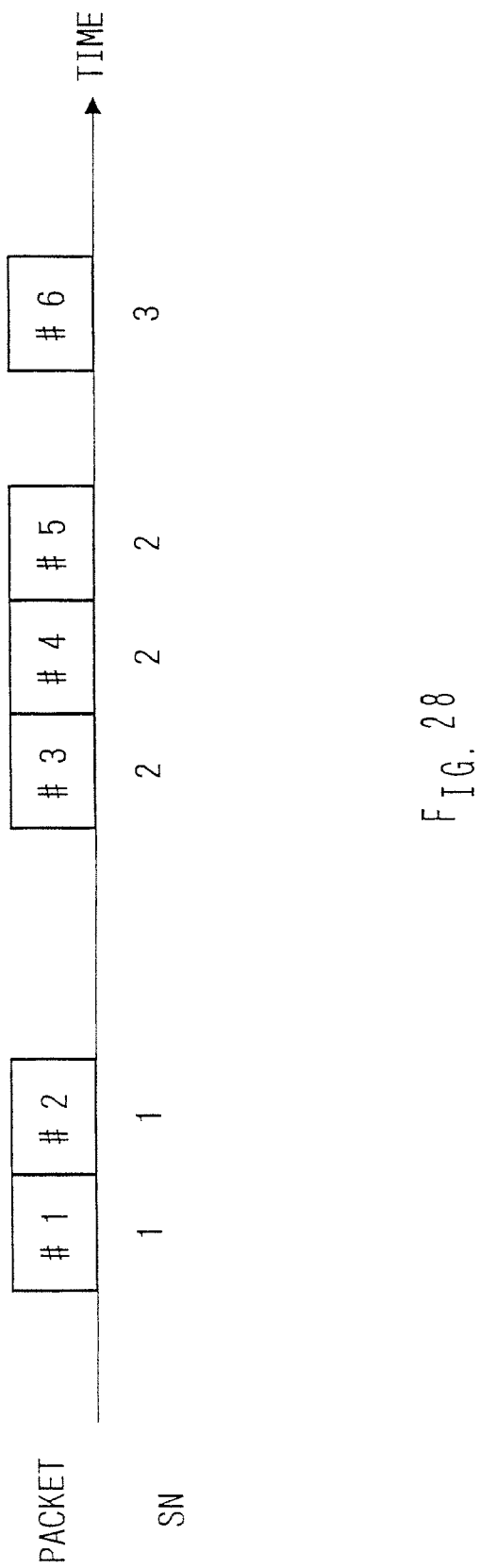
FIG. 28 is an operational view indicating communication state of a data packet concerning an embodiment 8 of the present invention.
Figure 29:
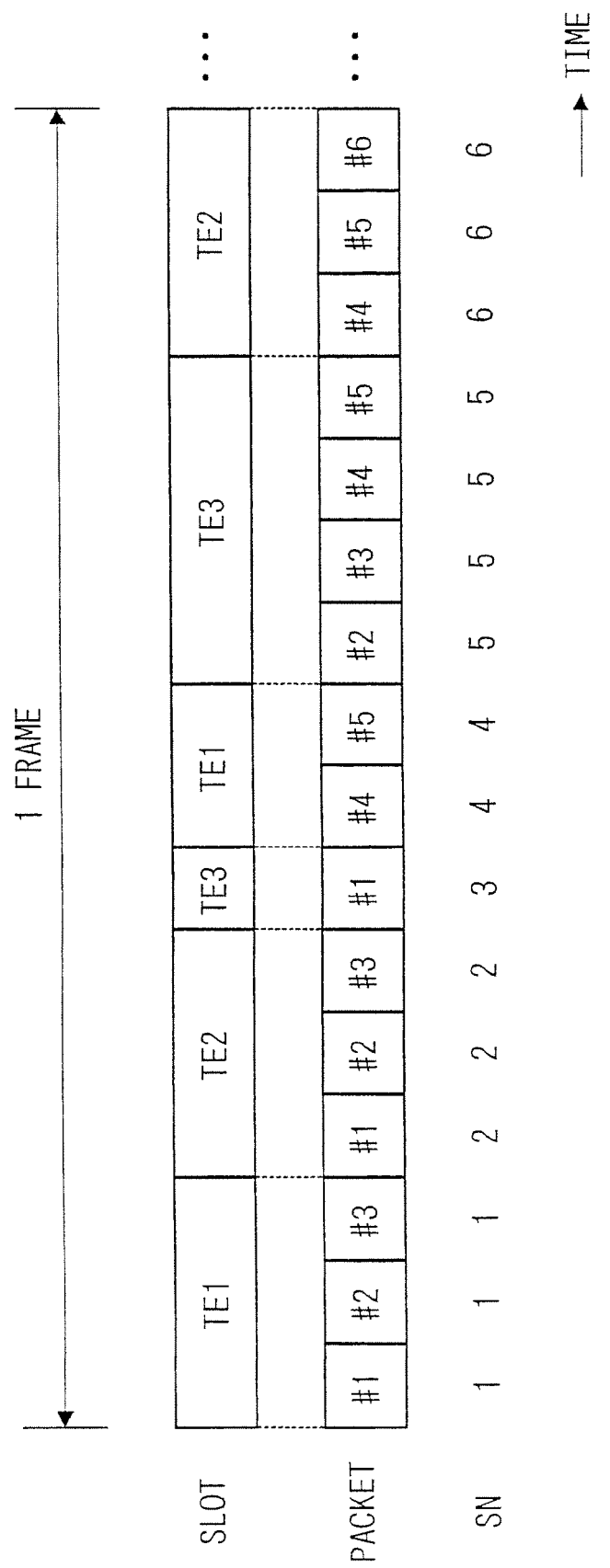
FIG. 29 is an operational view indicating communication state of a data packet concerning an embodiment 8 of the present invention.
Figure 30:
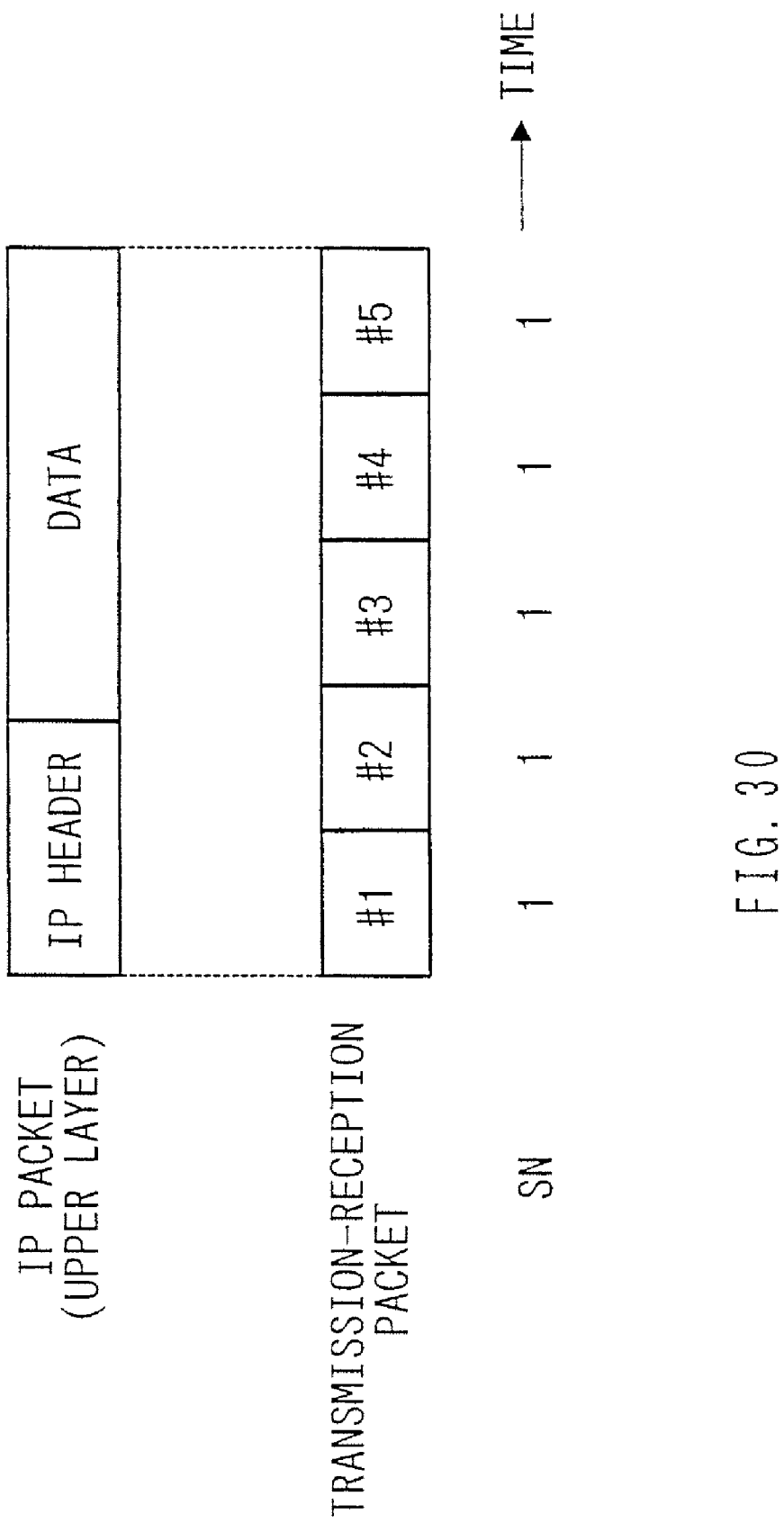
FIG. 30 is an operational view indicating communication state of a data packet concerning an embodiment 8 of the present invention.

Hereinafter, there will be described the transmission-reception apparatus concerning the present embodiment while employing FIG. 28 to FIG. 30. FIG. 28 to FIG. 30 are operational views indicating communication state of a data packet concerning the embodiment 8 of the present invention. Further, the block diagram of the transmission-reception apparatus concerning the present embodiment is the same as the block diagram concerning the embodiment 2 indicated in FIG. 6, therefore, the block diagram concerning the present embodiment is omitted.

FIG. 28 indicates the case where the same SN is added in every burst in packet communication. Each burst is individual communication station data. Even though only one packet comes out, the data transmission-reception is not normal for the communication station. Accordingly, the same SN is added, if there is the error in at least one, the whole should be retransmitted.

Further, FIG. 29 indicates the case of causing the same SN to be added in every slot unit. Each slot is individual communication station data. Even though only one packet comes out, the data transmission-reception is not normal for the communication station. Accordingly, the same SN is added, if there is the error in at least one, the whole should be retransmitted.

Furthermore, FIG. 30 indicates the case of adding the same SN, for instance, in every IP packet unit by way of upper layer. Each IP packet is processing unit on the occasion of the data processing. Even though only one packet comes out, the data is discarded. Accordingly, the same SN is added to the IP packet, if there is the error in at least one, the whole should be retransmitted.

Thus, according to the present embodiment, the transmission-reception apparatus does not add the SN in every packet to be a data unit on the occasion of transmission-reception, but the transmission-reception apparatus adds the SN in every data unit on the occasion of the data processing. When the error occurs even only one packet within data unit on the occasion of processing, if there is retransmission requirement about one SN, it is capable of performing retransmission instruction about the whole packets of the data unit on the occasion of the processing, therefore, the transmission-reception apparatus enables the transmission efficiency to be improved.

Further, any of the configuration of the ARQ control information in the embodiments described previously can be employed by way of the ARQ control information in the present embodiment.

EMBODIMENT 9

A transmission-reception apparatus and an error control method concerning the present embodiment have the same configuration as that of the embodiment 1. However, in this particular case, the transmission-reception apparatus transmits continuously ARQ control information employing a plurality of bit map format.

Figure 31:
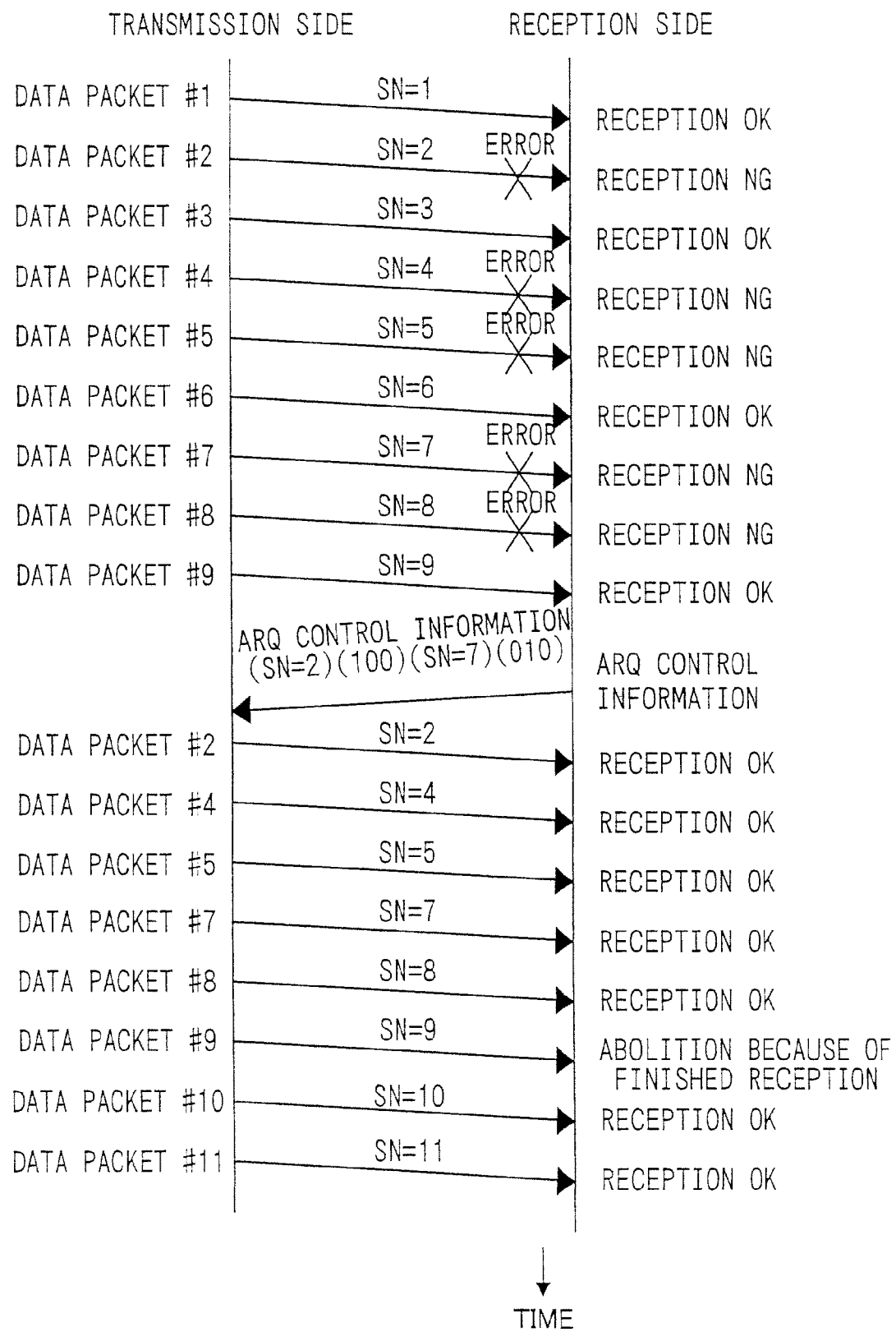
FIG. 31 is an operational diagram indicating one example of a sequence concerning an embodiment 9 of the present invention.

Hereinafter, there will be described about the transmission-reception apparatus and the error control method concerning the present embodiment while employing FIG. 31. FIG. 31 is an operational diagram indicating one example of a sequence concerning the embodiment 9 of the present invention. Further, the block diagram of the transmission-reception apparatus concerning the present embodiment is the same as the block diagram concerning the embodiment 2 indicated FIG. 6, therefore the block diagram of the present embodiment is omitted.

The ARQ control information employing the bit map format as indicated in FIG. 5 has an advantage that it is capable of transmitting information about the large number of SN with a few numbers of bit. However, it is capable of transmitting only information about the continuous SN because of bit string, thus the transmission efficiency deteriorates when the error occurs discretely.

So, in the present embodiment, the transmission-reception apparatus transmits the ARQ control information employing the bit map format indicated in FIG. 5 with the condition of continuous two, in addition to the fact of causing length of the bit string to be shortened.

FIG. 31 is one example of sequence in the present embodiment. In the first frame within the drawing, FIG. 31 indicates the case where the error occurs in the data packets #2, #4, #5, #7, #8.

The reception side reduces the bit string of the bit configuration indicated in FIG. 5 into three bits, before transmitting twice here. In this case, the ARQ control information comes into [SN=2] [100] [SN=7] [SN=010] as illustrated. Such the transmission method of the ARQ control information exercises effect for improving the transmission efficiency in the case where there exists many numbers of packets within the frame, and the error occurs discretely.

Thus, according to the present embodiment, the transmission-reception apparatus reduces the number of bit of the bit string within the bit configuration of the ARQ control information employing the bit map format, before transmitting with a plurality of times, therefore, the transmission efficiency can be improved in the case where the transmission-reception apparatus reduces the number of bit of the ARQ control information, and in particular, the error occurs discretely.

Further, any of the configuration of the ARQ control information in the embodiments described previously can be employed by way of the ARQ control information in the present embodiment. Moreover, a plurality of ARQ control information are not necessarily to transmit continuously if the bit configuration is capable of coping with discrete error.

EMBODIMENT 10

A transmission-reception apparatus and an error control method concerning the present embodiment has the same configuration as that of the embodiment 1. However, in this particular case, the transmission-reception apparatus changes configuration of the ARQ control information in compliance with occurrence condition of the error.

Figure 32:
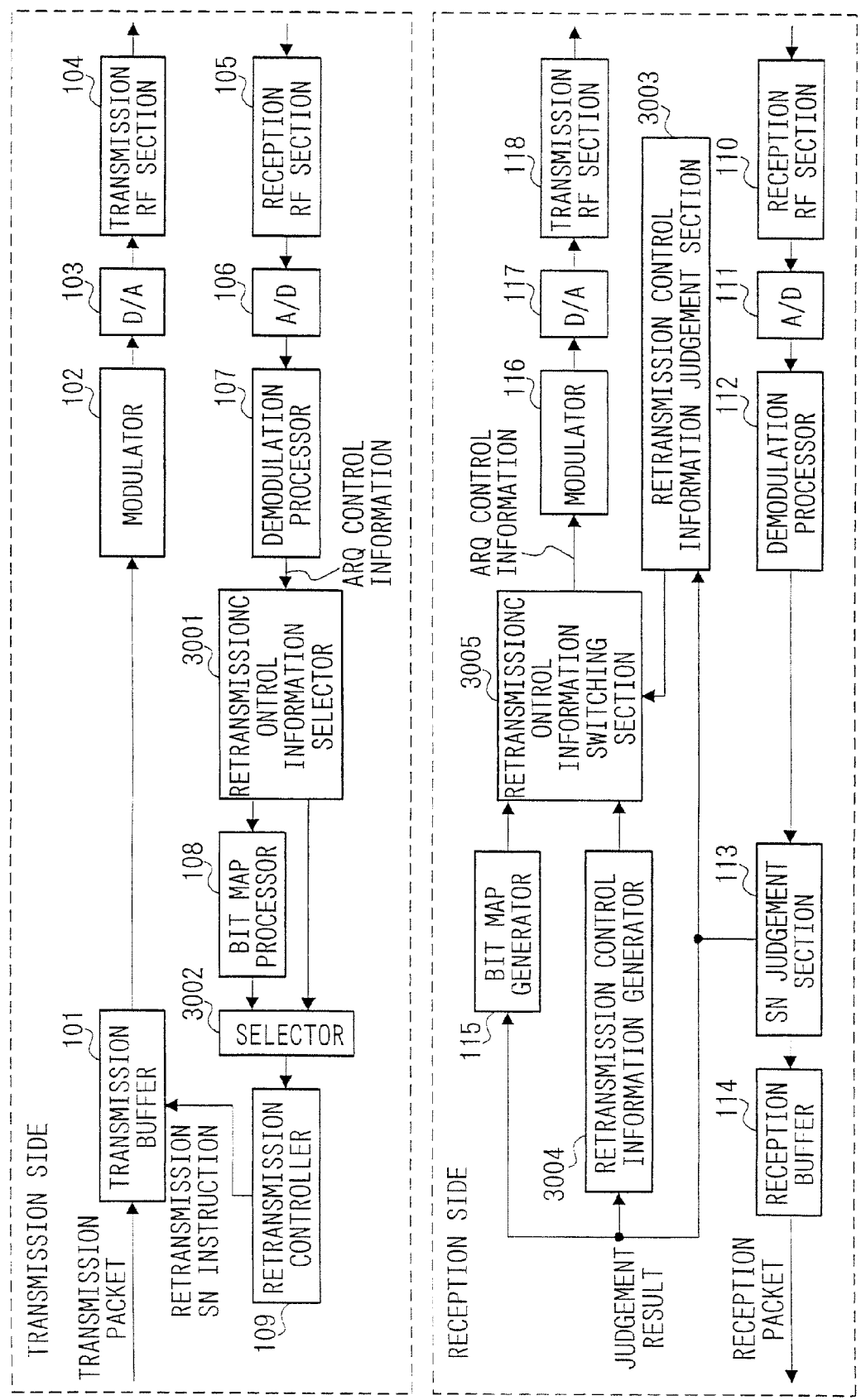
FIG. 32 is a block diagram indicating outline configuration of the transmission-reception apparatus concerning an embodiment 10 of the present invention.
Figure 33:
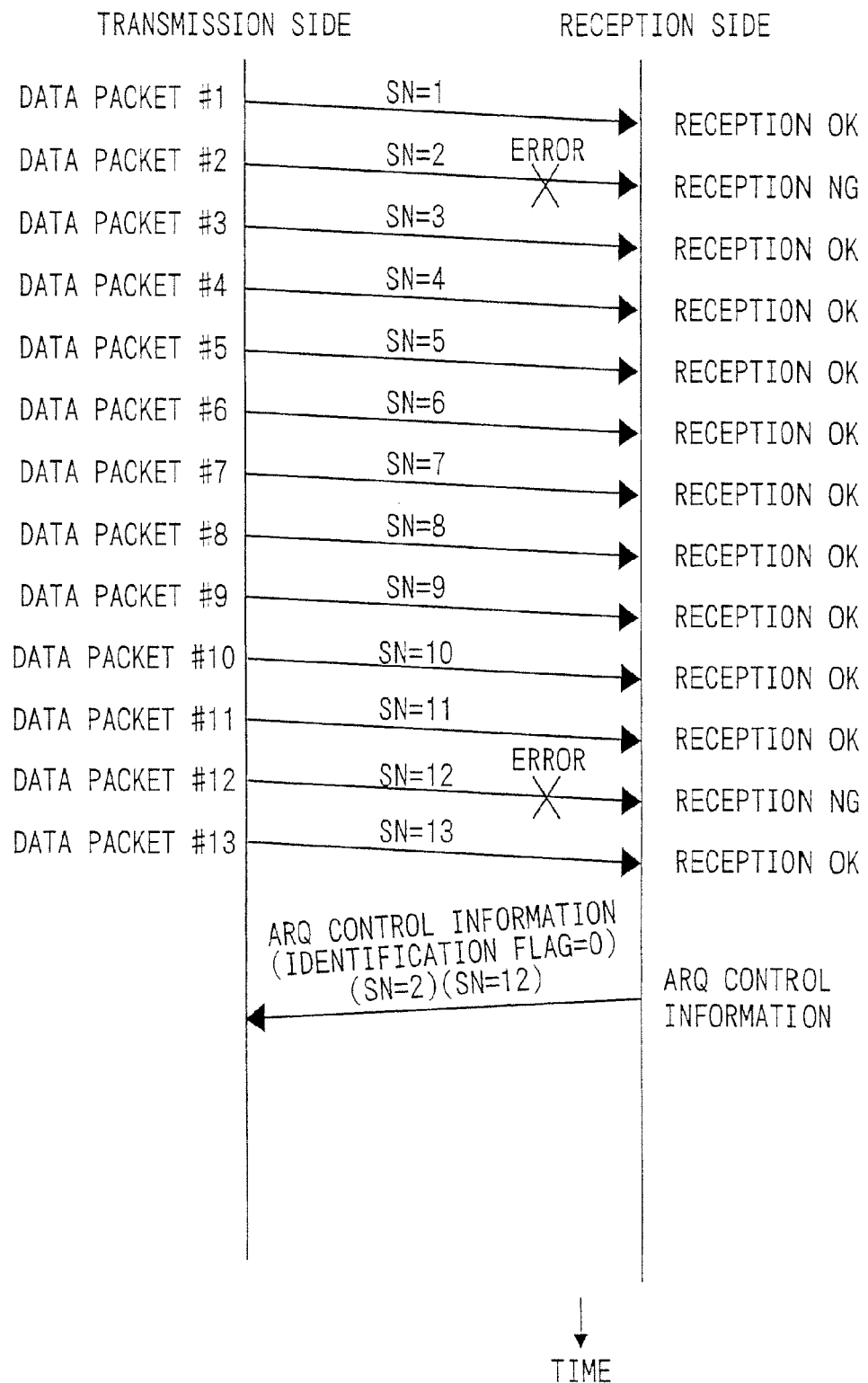
FIG. 33 is an operational diagram indicating one example of a sequence concerning the embodiment 10 of the present invention.
Figure 34:
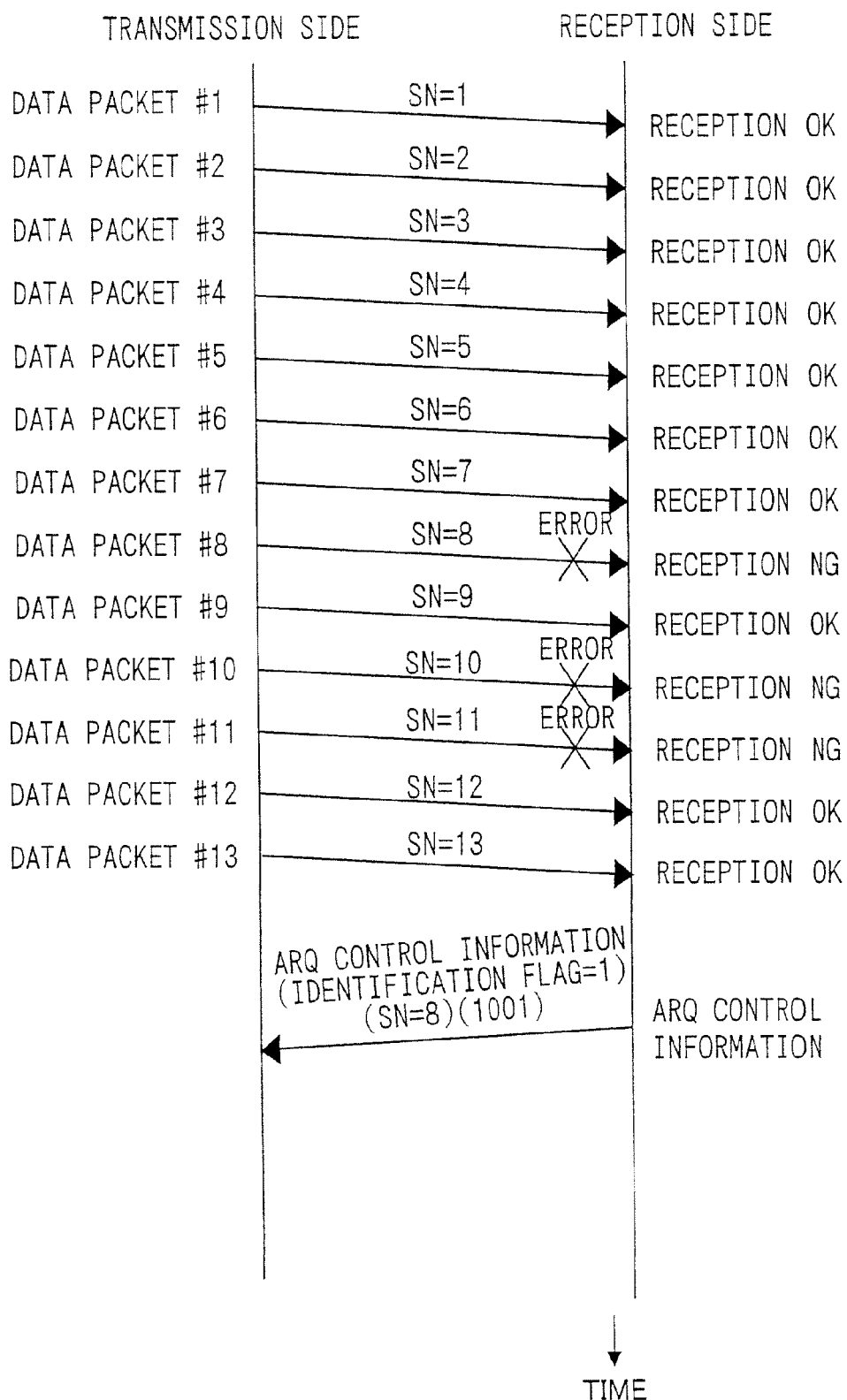
FIG. 34 is an operational diagram indicating one example of a sequence concerning the embodiment 10 of the present invention.
Figure 35A:
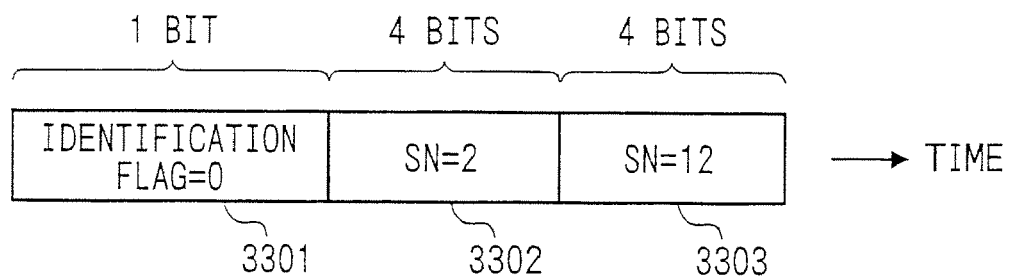
FIG. 35A is a configuration view indicating one configuration example of the ARQ control information concerning the embodiment 10 of the present invention.
Figure 35B:
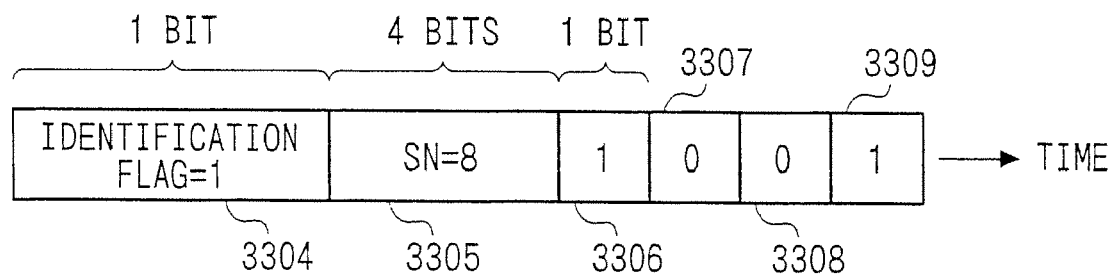
FIG. 35B is a configuration view indicating one configuration example of the ARQ control information concerning the embodiment 10 of the present invention.

Hereinafter, there will be described a transmission-reception apparatus and an error control method concerning the present embodiment while employing FIG. 32 to FIG. 35. FIG. 32 is a block diagram indicating outline configuration of the transmission-reception apparatus concerning the embodiment 10 of the present invention. FIG. 33 and FIG. 34 are operational diagrams indicating one example of a sequence concerning the embodiment 10 of the present invention. FIG. 35A and FIG. 35B are configuration views indicating one configuration example of the ARQ control information concerning the embodiment 10 of the present invention. Further, the same sign is added to the same configuration as that of the embodiment 1, to omit detailed description.

A bit configuration indicated in FIG. 35A is obtained in such a way that one bit (a bit 3301) indicating an identification flag is added to configuration (a bit group 3302 and a bit group 3303) of the ARQ control information in an ordinary PRIME-ARQ system. A bit configuration indicated in FIG. 35B is obtained in such a way that one bit (a bit 3304) indicating an identification flag is added to configuration (a bit group 3305 and bits 3306 to 3309) of the ARQ control information employing the bit map format.

If the identification flag is 0 (zero), the identification flag indicates that the ARQ control information is transmitted while conforming to the ordinary PRIME-ARQ system. If the identification flag is 1 (one), the identification flag indicates that the ARQ control information employing the bit map format is transmitted.

In the transmission side indicated in FIG. 32, a retransmission control information selector 3001 discriminates bit configuration of the ARQ control information on the basis of an identification flag within the received ARQ control information. The transmission side outputs the received ARQ control information to a bit map processor 108 when the bit configuration is the bit map format. The transmission side outputs the received ARQ control information to a retransmission controller 109 through a selector 3002 when the bit configuration is the configuration of the ordinary PRIME-ARQ system.

On the other hand, in the reception side, a retransmission control information judgement section 3003 discriminates whether the error of the SN is continuous error or discrete error from the output of a SN judgement section 113 to communicate to a retransmission control information switching section 3005. A retransmission control information generator 3004 generates ARQ control information of the ordinary PRIME-ARQ system on the basis of the output of the SN judgement section 113. The retransmission control information switching section 3005 outputs selectively either ARQ control information of the ordinary PRIME-ARQ system generated by the retransmission control information generator 3004 or ARQ control information employing the bit map format generated by the bit map generator 115 on the basis of the output of the retransmission control information judgement section 3003.

Let's assume that the number of packet of one frame is 13. As indicated in FIG. 33, when the error occurs discretely such that the SN corresponding to the error is 2 as well as 12, the transmission efficiency is good when employing the regular PRIME-ARQ system. Further, as indicated in FIG. 34, when the error occurs non-discretely such that the SN corresponding to the error is "SN=8, 10, 11", the transmission efficiency is improved while employing the bit map format.

Thus, according to the present embodiment, the configuration of the ARQ control information is switched adaptively according to error occurrence condition within the frame, therefore, it is capable of improving the transmission efficiency.

Further, the configuration of the ARQ control information which is switched by the transmission-reception apparatus concerning the present embodiment is not limited by the above described two configurations. The configurations of the ARQ control information in any embodiment described previously can be employed.

Furthermore, the identification flag is not limited to 1 (one) bit. The identification flag is comprised of more than 2 bits, thereby, it is also capable of switching configuration more than 2.

Moreover, a kind of the ARQ control information is not switched, but the transmission-reception apparatus fluctuates number of bit of the bit map format while adopting the same configuration of the ARQ control information. Thus, it is also capable of fluctuating either the number of bit or the number of bit group.

EMBODIMENT 11

A transmission-reception apparatus concerning the present embodiment has the same configuration as that of the embodiment 10. However, in this particular case, The transmission-reception apparatus changes the number of bit for employing for the sake of ARQ control information in compliance with line quality while presuming the line quality employing judgement error of a demodulation signal.

Figure 36:
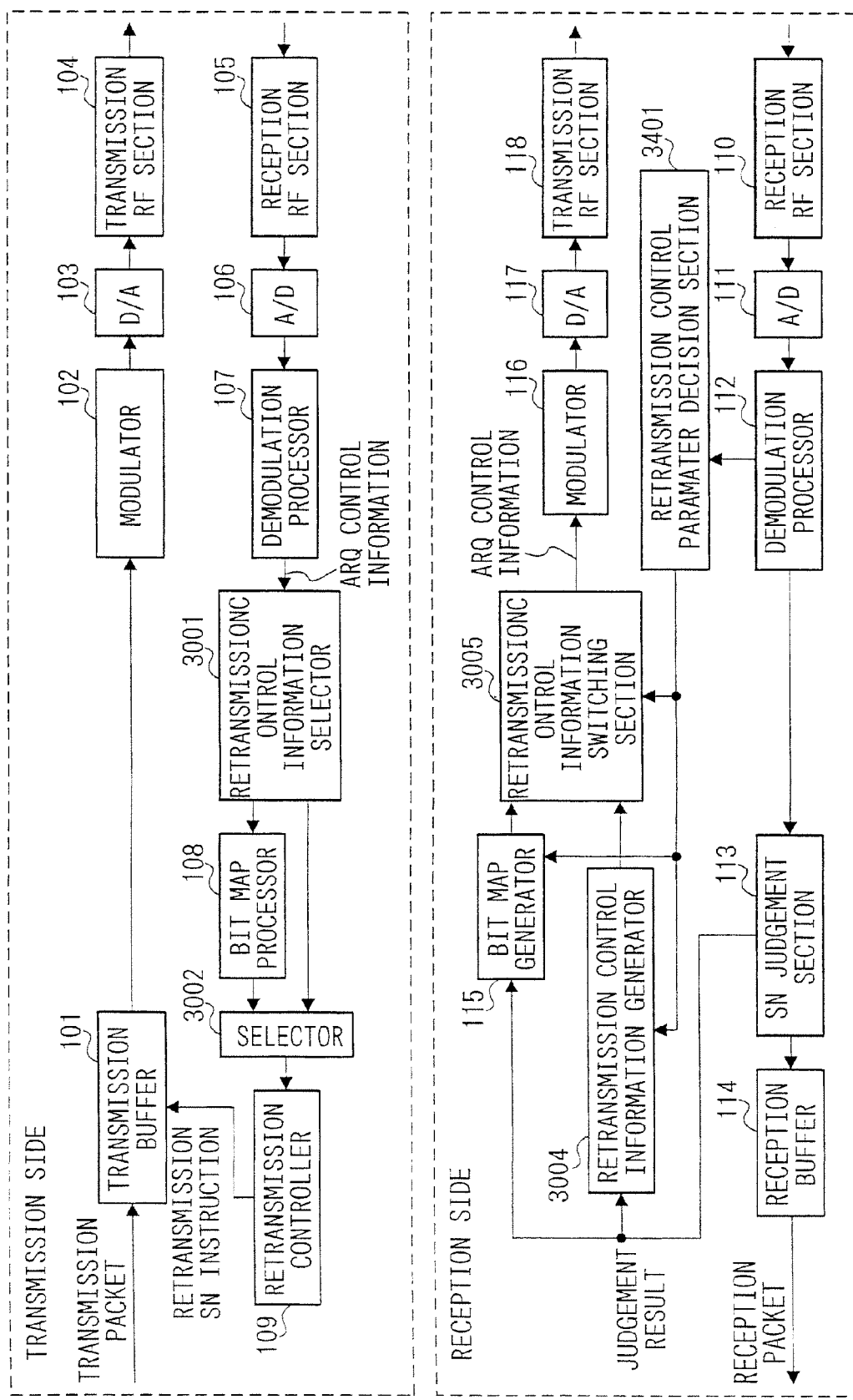
FIG. 36 is a block diagram indicating outline configuration of the transmission-reception apparatus concerning an embodiment 11 of the present invention.
Figure 37:
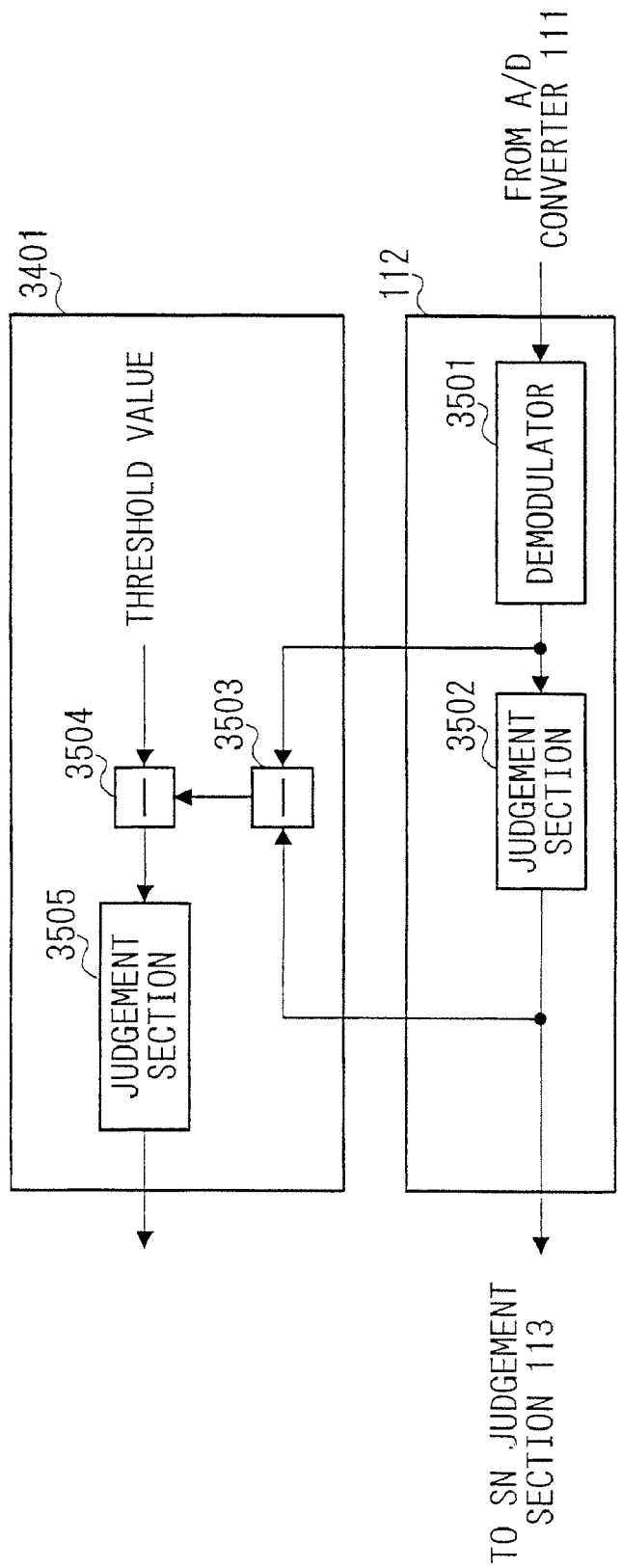
FIG. 37 is a block diagram indicating outline configuration of a demodulation processor and a retransmission control parameter judgement section of the transmission-reception apparatus concerning the embodiment 11 of the present invention.

Hereinafter, there will be described about the transmission-reception apparatus concerning the present embodiment while employing FIG. 36 and FIG. 37. FIG. 36 is a block diagram indicating outline configuration of the transmission-reception apparatus concerning the embodiment 11 of the present invention. FIG. 37 is a block diagram indicating outline configuration of a demodulation processor and a retransmission control parameter judgement section of the transmission-reception apparatus concerning the embodiment 11 of the present invention. Further, the same sign is added to the same configuration as that of the embodiment 10 to omit detailed description.

In FIG. 36, a retransmission control parameter judgement section 3401 presumes line quality of a reception signal from an output of the demodulation processor. The retransmission control parameter judgement section 3401 controls a bit map generator 115, a retransmission control information generator 3004, and a retransmission control information switching section 3005 in compliance with the presumed line quality. The retransmission control parameter judgement section 3401 also fluctuates either the number of bits or the number of bit group which is employed for the ARQ control information of the ordinary PRIME-ARQ system as well as the ARQ control information employing the bit map format.

In FIG. 37, a demodulator 3501 demodulates a reception signal, and a judgement section 3502 performs judgement of a signal point. A subtracter 3503 calculates judgement error while performing subtraction processing between an input signal and an output signal of a judgement section 3502, and a subtracter 3504 performs subtraction processing between the judgement error to the output of the subtracter 3503 and a threshold value, and a judgement section 3505 performs size judgement.

According to the judgement result, the transmission-reception apparatus determines that when the judgement error is larger than prescribed value, the line quality is very poor condition, while when the judgement error is smaller than the prescribed value, the line quality is good condition. When the line quality is very poor, the transmission-reception apparatus schemes to improve an error rate while increasing the number of bit or the number of bit group employed for the ARQ control information. While when the line quality is good, the transmission-reception apparatus schemes to improve the transmission efficiency while reducing the number of bit or the number of bit group.

Thus, according to the present embodiment, the transmission-reception apparatus changes adaptively the number of bit or the number of bit group employed for the ARQ control information in compliance with the line quality, therefore, it is capable of scheming improvement of the transmission efficiency while suppressing the error rate in low level.

EMBODIMENT 12

A transmission-reception apparatus concerning the present embodiment has the same configuration as that of embodiment 11. However, in this particular case, the transmission-reception apparatus equalizes the judgement error before employing equalized judgement error.

Figure 38:
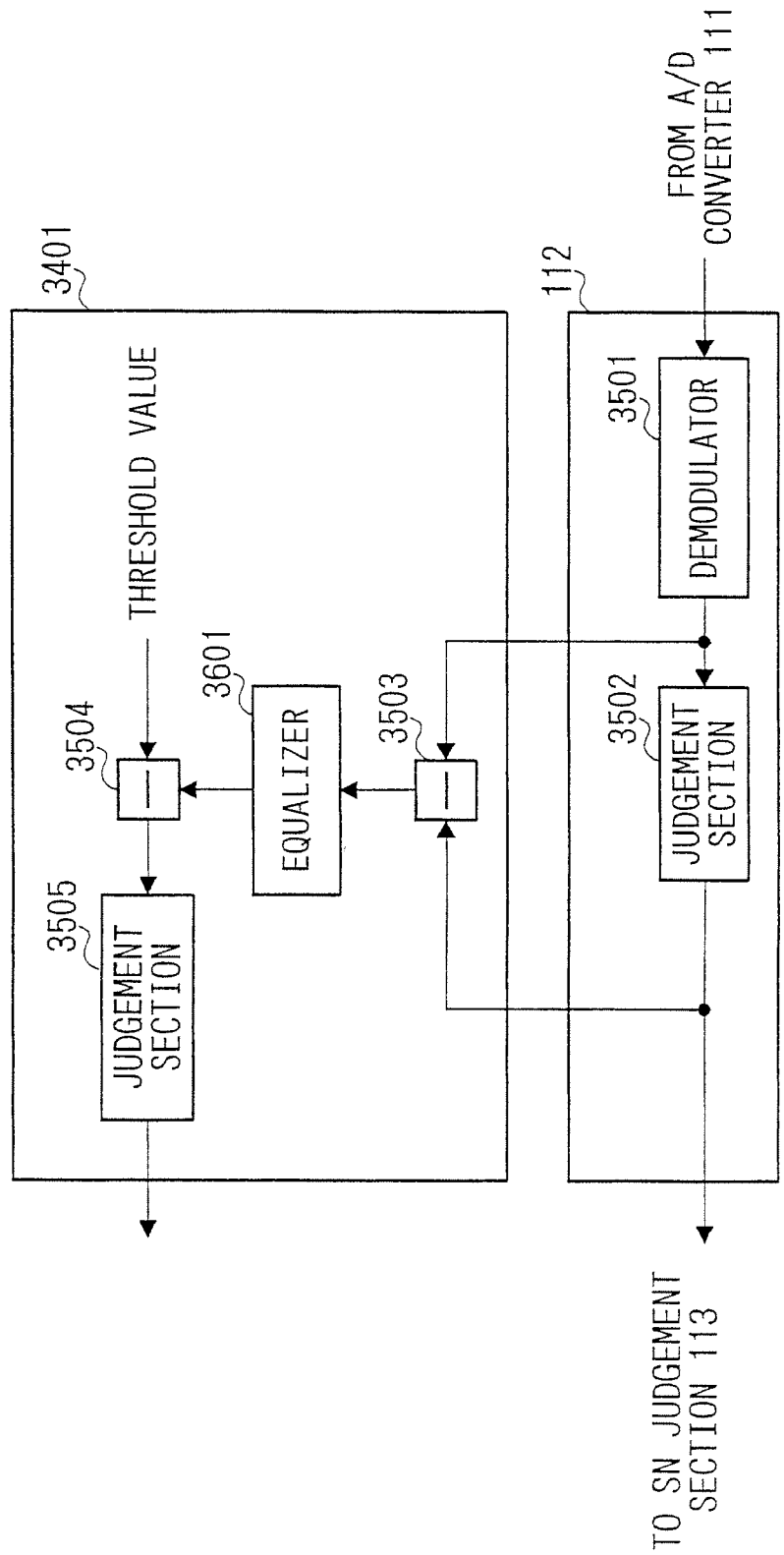
FIG. 38 is a block diagram indicating outline configuration of a demodulation processor and a retransmission control parameter judgement section of the transmission-reception apparatus concerning the embodiment 12 of the present invention.

Hereinafter, there will be described about the transmission-reception apparatus concerning the present embodiment while employing FIG. 38. FIG. 38 is a block diagram indicating outline configuration of a demodulation processor and a retransmission control parameter judgement section of the transmission-reception apparatus concerning the embodiment 12 of the present invention. Further, the same sign is added to the same configuration as that of the embodiment 11 to omit detailed description.

In FIG. 38, an equalizer 3601 equalizes a judgement error to be an output of a subtracter 3503.

Thus, according to the present embodiment, the transmission-reception apparatus equalizes the judgement error before employing the equalized judgement error, therefore, it is capable of improving detection precision of the line quality.

EMBODIMENT 13

A transmission-reception apparatus concerning the present embodiment has the same configuration as that of the embodiment 12. However, in this particular case, the transmission-reception apparatus equalizes a judgement error within inter-slot before employing the equalized judgement error.

Figure 39:
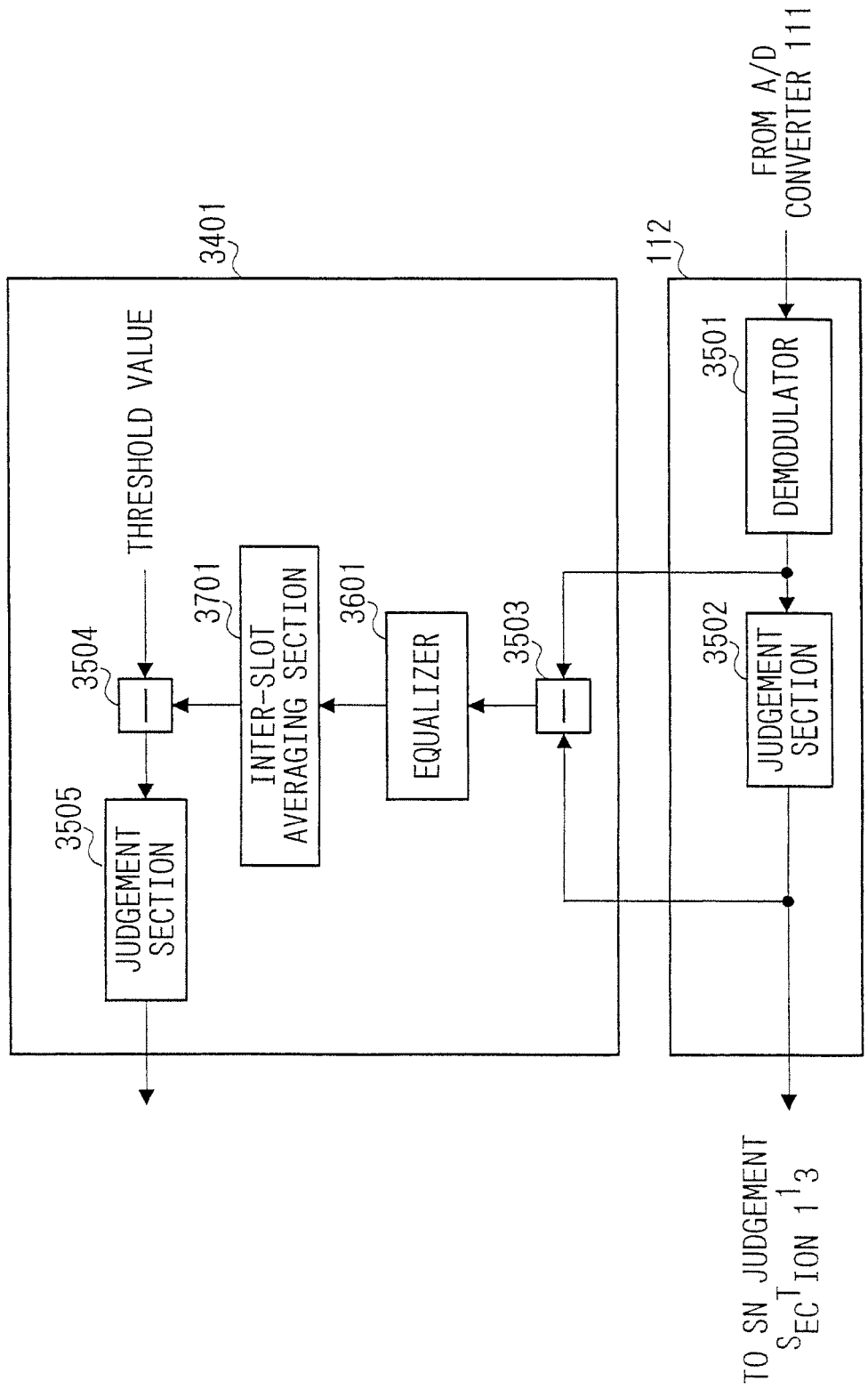
FIG. 39 is a block diagram indicating outline configuration of a demodulation processor and a retransmission control parameter judgement section of the transmission-reception apparatus concerning the embodiment 13 of the present invention.
Figure 40:
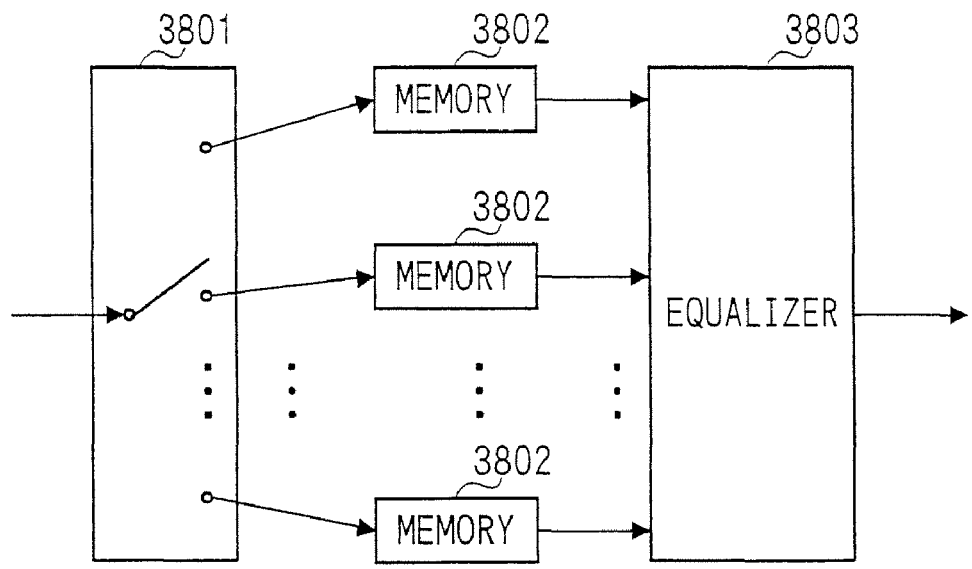
FIG. 40 is a block diagram indicating outline configuration of an inter-slot averaging section of the transmission-reception apparatus concerning the embodiment 7 of the present invention.

Hereinafter, there will be described about the transmission-reception apparatus concerning the present embodiment while employing FIG. 39 and FIG. 40. FIG. 39 is a block diagram indicating outline configuration of a demodulation processor and a retransmission control parameter judgement section of the transmission-reception apparatus concerning the embodiment 13 of the present invention. FIG. 40 is a block diagram indicating outline configuration of inter-slot averaging means of the transmission-reception apparatus concerning the embodiment 7 of the present invention. Further, the same sign is added to the same configuration as that of the embodiment 12 to omit detailed description.

In FIG. 39, inter-slot averaging means 3701 calculates average value of a judgement error of respective equalized slots to output to a subtracter 3504.

In FIG. 40, a switch 3801 switches output destination in every slot. A memory 3802 stores therein equalized judgement error of respective slots temporarily. An equalizer 3803 performs equalization processing to the equalized judgement error of respective slots.

Thus, according to the present embodiment, since the transmission-reception apparatus equalizes averaged judgement error in respective slots in between the slots, it is capable of improving line quality presumption precision.

EMBODIMENT 14

A transmission-reception apparatus concerning the present embodiment has the same configuration as that of the embodiment 13. However, in this particular case, the transmission-reception apparatus takes an weighted average between a line presumption value before one frame and a line presumption value of the present frame.

Figure 41:
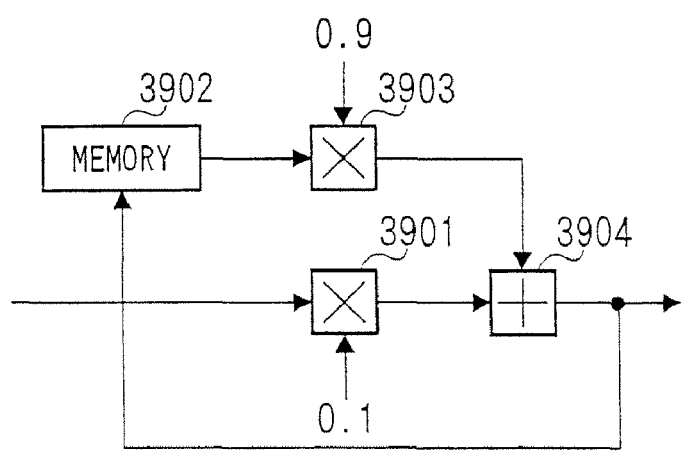
FIG. 41 is a block diagram indicating outline configuration of an inter-slot averaging section of the transmission-reception apparatus concerning the embodiment 14 of the present invention.

Hereinafter, there will be described about the transmission-reception apparatus concerning the present embodiment while employing FIG. 41. FIG. 41 is a block diagram indicating outline configuration of an inter-slot averaging section of the transmission-reception apparatus concerning the embodiment 14 of the present invention. Further, the same sign is added to the same configuration as that of the embodiment 13 to omit detailed description.

In FIG. 41, a multiplier 3901 multiplies a line presumption value of the present frame by 0.1. A memory 3902 stores therein a line presumption value of one frame before. A multiplier 3903 multiplies a line presumption value of one frame before by 0.9. An adder 3904 adds an output of the multiplier 3901 and an output of the multiplier 3903 to output to the subtracter 3504.

Thus, according to the present embodiment, the transmission-reception apparatus takes the weighted average between the line presumption value of one frame before and the line presumption value of the present frame, therefore, it is capable of improving precision of line quality presumption.

EMBODIMENT 15

A transmission-reception apparatus concerning the present embodiment has the same configuration as that of the embodiment 14. However, in this particular case, the transmission-reception apparatus causes value of coefficient for employing for weighted average to be variable.

Figure 42:
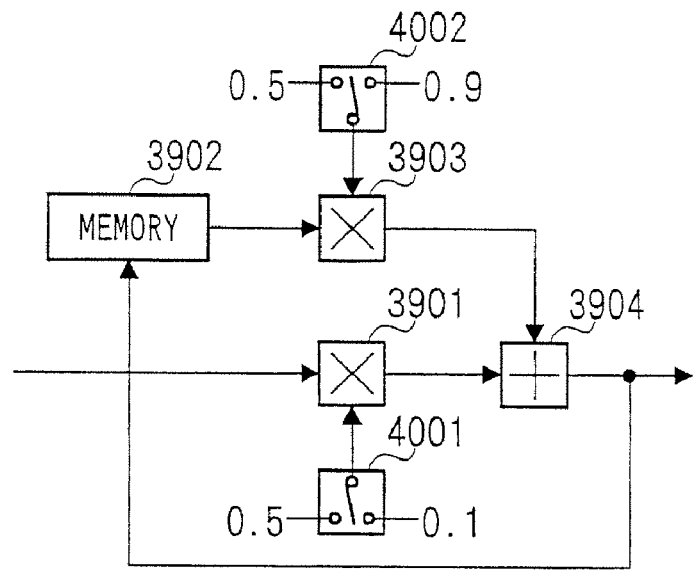
FIG. 42 is a block diagram indicating outline configuration of an inter-slot averaging section of the transmission-reception apparatus concerning the embodiment 15 of the present invention.

Hereinafter, there will be described about the transmission-reception apparatus concerning present embodiment while employing FIG. 42. FIG. 42 is a block diagram indicating outline configuration of an inter-slot averaging section of the transmission-reception apparatus concerning the embodiment 15 of the present invention. Further, the same sign is added to the same configuration as that of the embodiment 14 to omit detailed description.

In FIG. 42, a switch 4001 outputs selectively either 0.5 or 0.1, and a switch 4002 outputs selectively either 0.5 or 0.9. A sum of coefficient outputted from the switch 4001 and the switch 4002 always shall come into 1 (one).

Thus, according to the present embodiment, the transmission-reception apparatus causes the coefficient employed for the weighted average to be variable, therefore, it is capable of expediting converging speed of the weighted average processing.

EMBODIMENT 16

A transmission-reception apparatus concerning the present embodiment has the same configuration as that of the embodiment 14. However, in this particular case, the transmission-reception apparatus materializes a weighted average with bit shift.

Figure 43:
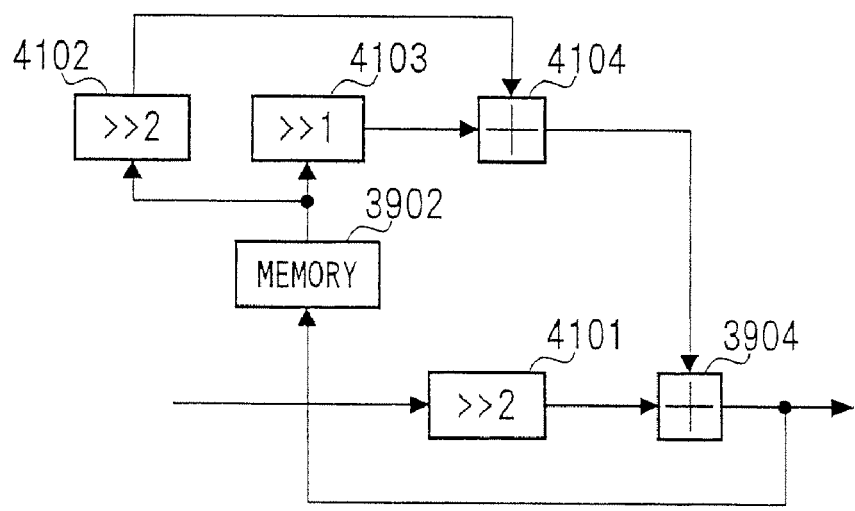
FIG. 43 is a block diagram indicating outline configuration of an inter-slot averaging section of the transmission-reception apparatus concerning the embodiment 16 of the present invention.

Hereinafter, there will be described about the transmission-reception apparatus concerning the present embodiment while employing FIG. 43. FIG. 43 is a block diagram indicating outline configuration of an inter-slot averaging section of the transmission-reception apparatus concerning the embodiment 16 of the present invention. Further, the same sign is added to the same configuration as that of the embodiment 14 to omit detailed description.

In view of the matter that, generally, when it causes a digital signal to be shifted by 1 (one) bit, an amplitude becomes half the size. Accordingly, it is capable of eliminating a multiplier with calculation quantity from the inter-slot averaging section 3701 by employing a bit shifter.

A 2-bit shifter 4101 causes a line presumption value of the present frame to be shifted by 2 bits to make the line presumption value 0.25 times thereof. A 2-bit shifter 4102 and a 1-bit shifter 4103 cause a line presumption value of 1 (one) frame before that is an output of a memory 3902 to be shifted by 2 bits and by 1 bit respectively to make the line presumption values 0.25 times thereof and 0.5 times thereof respectively.

An adder 4104 adds an output of the 2-bit shifter 4102 and an output of the 1-bit shifter 4103 to produce 0.75 times of the line presumption value of one frame before. Lastly, an adder 3904 adds an output of the 2-bit shifter 4101 and an output of the adder 4104 to output to a subtracter 3504.

Thus, according to the present embodiment, the transmission-reception apparatus is capable of materializing the weighted average processing with a bit shift, therefore, it is capable of reducing calculation quantity.

Further, in the above-described embodiments 1 to 16, the CRC check (Cyclic Redundancy Check) is mentioned as example by way of method of error check. However, if error judgement is possible, any method is suitable.

Furthermore, above-described embodiments 1 to 16 are capable of being executed while appropriately combining embodiments with each other. It is capable of ignoring whether numerical value represented by bit is SN or frame number in the form concerning transmission control.

As described-above, the transmission-reception apparatus concerning the present invention receives the ARQ control information which is comprised of one sequence number corresponding to data packet in which the error occurs in the first place, and bit information representing existence of retransmission requirements about following sequence number of the above first occurrence sequence number. The transmission-reception apparatus is configured such that the transmission-reception apparatus retransmits the whole packets of the packet corresponding to the sequence number instructed by the ARQ control information and the packets finished transmission corresponding to the numbers followed on the heels of the sequence number which is the latest number concerning the temporal order from among the sequence numbers instructed by the ARQ control information.

According to this configuration, the ARQ retransmission control information is not the configuration consisting of SN group requiring retransmission, but the ARQ retransmission control information is configured from one SN requiring retransmission and bit map representing existence of retransmission about SN followed on the heels of the above one SN, therefore, it is capable of improving error rate, while increasing retransmission control information quantity without deteriorating the transmission efficiency.

The transmission-reception apparatus of the present invention receives the ARQ control information which is comprised of one inner-frame position information corresponding to the first occurrence of the error and bit information representing existence of retransmission requirement about position information followed on the heels of the position of the above inner-frame position information. The transmission-reception apparatus is configured such that the transmission-reception apparatus retransmits the whole packets of the packet corresponding to the position instructed by the ARQ control information and the packets finished transmission corresponding to the number followed on the heels of the position which is the latest position concerning temporal order from among the positions instructed by the ARQ control information.

According to the configuration, it is unnecessary to add SN to the packet or the cell to be transmitted, therefore, it is capable of reducing transmission quantity of the data itself, further it is capable of reducing about the number of bit employed for the ARQ control information, therefore, the transmission efficiency is improved.

The transmission-reception apparatus of the present invention in the above configuration is configured such that the ARQ control information includes frame number indicating position of the frame.

According to the configuration, when the transmission-reception apparatus communicates the packet in which the error occurs by employing the position information within the frame for the ARQ control information, the transmission side can discriminate easily whether the ARQ control information corresponds to how many frames before, even though when the error occurs in a plurality of ARQ control information, because the reception side employs frame relative number for the ARQ control information. Thus, it is capable of performing appropriate retransmission.

The transmission-reception apparatus of the present invention, in the above configuration, is configured such that prescribed low order bit of the sequence number is deleted. According to this configuration, it is capable of improving the transmission efficiency because the smaller data quantity is sufficient for transmitting the same ARQ control information.

The transmission-reception apparatus of the present invention, in the above configuration, is configured such that the transmission-reception apparatus changes adaptively the number of bit to be deleted. According to this configuration, the transmission-reception apparatus enables the number of bit for deletion to be variable adaptively during communication, then communicating deleted number of bit to the transmission side, therefore, it is capable of further improving the transmission efficiency.

The transmission-reception apparatus of the present invention, in the above configuration, is configured such that the ARQ control information is transmitted by common channel. According to the configuration, it is capable of improving the transmission efficiency because it is unnecessary to transmit the ARQ control information in every communication remote station.

The transmission-reception apparatus of the present invention, in the above configuration, is configured such that the same sequence number is set within the prescribed data unit. According to the configuration, the transmission-reception apparatus does not add the SN in every packet to be the data unit on the occasion of the transmission-reception, but the transmission-reception apparatus adds the SN in every data unit on the occasion of the data processing. When the error occurs in only one packet within the data unit on the occasion of processing, if the transmission-reception apparatus performs retransmission requirement about one SN, it is capable of performing retransmission instruction about the whole packets of the data unit on the occasion of processing, therefore, it is capable of improving the transmission efficiency.

The transmission-reception apparatus of the present invention, in the above configuration, is configured such that the transmission-reception apparatus transmits a plurality of the ARQ control information continuously. According to the configuration, when, in particular, the error occurs discretely, while reducing the number of bit of the ARQ control information, it is capable of improving the transmission efficiency.

The transmission-reception apparatus of the present invention, in the above configuration, is configured such that the transmission-reception apparatus changes configuration of the ARQ control information in compliance with occurrence condition of the error or the line quality. According to the configuration, the transmission-reception apparatus can select optimum configuration of the ARQ control information adaptively in compliance with occurrence condition of the error or the line quality, therefore, it is capable of improving the transmission efficiency.

The transmission-reception apparatus of the present invention, in the above configuration, is configured such that the transmission-reception apparatus changes the number of bit configuring the ARQ control information in compliance with the occurrence condition of the error or the line quality. According to the configuration, the transmission-reception apparatus can select the optimum number of bit adaptively in compliance with occurrence condition of the error or the line quality, thus it is capable of improving the transmission efficiency.

The error control method of the present invention is that the transmission-reception apparatus receives the ARQ control information that is comprised of one sequence number corresponding to the first occurrence of packet's error and bit information representing existence of retransmission requirements about the sequence numbers followed on the heels of the above one sequence number, and that the transmission-reception apparatus retransmits the whole packets consisting of a packet corresponding to the sequence number instructed by the ARQ control information and packets finished transmission corresponding to sequence numbers followed on the heels of the latest sequence number concerning temporal order from among the sequence numbers instructed by the ARQ control information. According to the error control method, it is capable of reducing the error rate without deteriorating the transmission efficiency.

The present description is based on the Japanese Patent Application No. HEI 11-107032 applied on Mar. 10, 1999, and the Japanese Patent Application No. HEI 11-074632 applied on Mar. 18, 1999. The whole content thereof is included in the description.

INDUSTRIAL APPLICABILITY

The present invention is applicable to a communication terminal apparatus and a base station apparatus in a digital radio communication system. According to the present invention, it is capable of performing radio communication while reducing the error rate without deteriorating the communication efficiency.

The invention claimed is:

1. A transmission reception apparatus comprising:
a receiver operable to receive a plurality of packets;
an error detection section operable to detect an error in at least one of the plurality of packets;
an omitted sequence number generating section operable to generate an omitted sequence number by deleting at least one low order bit from a sequence number of one of the plurality of packets if an error is detected by the error detection section; and
a transmitter operable to transmit Automatic Repeat reQuest (ARQ) control information including the omitted sequence number.

2. The transmission-reception apparatus according to claim 1, wherein said ARQ control information includes one sequence number corresponding to a first occurrence of a packet error and bit information representing the existence of retransmission requirements about sequence numbers following said one sequence number.

3. The transmission-reception apparatus according to claim 1, wherein said ARQ control information includes frame numbers indicating a position of a frame.

4. The transmission-reception apparatus according to claim 1, wherein said omitted sequence number generating section adaptively changes the number of low order bits to be deleted.

5. The transmission-reception apparatus according to claim 1, wherein said ARQ control information is transmitted by a common channel.

6. The transmission-reception apparatus according to claim 1, wherein the same sequence number is set within a prescribed data unit.

7. The transmission-reception apparatus according to claim 1, wherein said transmitter further transmits a plurality of ARQ control information continuously.

8. The transmission-reception apparatus according to claim 1, further comprising a changer that changes the configuration of said control information in compliance with either an occurrence condition of an error or a line quality.

9. The transmission-reception apparatus according to claim 1, further comprising a changer that changes the number of bits which configures said ARQ control information in compliance with either an occurrence condition of an error or a line quality.

10. An error control method comprising:
 receiving a plurality of packets;
 detecting an error in at least one of the plurality of packets;
 generating an omitted sequence number by deleting at least one low order bit from a sequence number of one of the plurality of packets if an error is detected by the error detecting step; and
 transmitting Automatic Repeat reQuest (ARQ) control information including the omitted sequence number.

11. A transmission reception apparatus comprising:
 a receiver operable to receive Automatic Repeat reQuest (ARQ) control information including an omitted sequence number representing a plurality of packets for retransmission; and
 a transmitter operable to retransmit the plurality of packets corresponding to the omitted sequence number, wherein:
 the omitted sequence number is generated by omitting at least one low order bit of a sequence number.

12. A communication terminal apparatus which is provided with the transmission reception apparatus described in claim 11.

13. A base station apparatus which is provided with the transmission reception apparatus described in claim 11.

14. An error control method comprising:
 receiving Automatic Repeat reQuest (ARQ) control information including an omitted sequence number representing a plurality of packets for retransmission; and
 retransmitting the plurality of packets corresponding to the omitted sequence number, wherein:
 the omitted sequence number is generated by omitting at least one low order bit of a sequence number.

* * * * *